(12) United States Patent
Vistad et al.

(10) Patent No.: US 11,753,114 B2
(45) Date of Patent: Sep. 12, 2023

(54) SNOWMOBILE

(71) Applicant: Polaris Industries Inc., Medina, MN (US)

(72) Inventors: Jan R. Vistad, Roseau, MN (US); Dustin A. Mertens, Roseau, MN (US); Andrew J. Mills, Daniel, WY (US); Michael A. Hedlund, Roseau, MN (US)

(73) Assignee: Polaris Industries Inc., Medina, MN (US)

(*) Notice: Subject to any disclaimer, the term of this patent is extended or adjusted under 35 U.S.C. 154(b) by 0 days.

(21) Appl. No.: 17/679,595

(22) Filed: Feb. 24, 2022

(65) Prior Publication Data

US 2022/0177077 A1    Jun. 9, 2022

Related U.S. Application Data

(60) Continuation of application No. 16/505,996, filed on Jul. 9, 2019, now Pat. No. 11,286,019, which is a
(Continued)

(51) Int. Cl.
*B62M 27/02* (2006.01)

(52) U.S. Cl.
CPC ....... *B62M 27/02* (2013.01); *B62M 2027/023* (2013.01); *B62M 2027/028* (2013.01)

(58) Field of Classification Search
CPC ............ B62M 27/02; B62M 2027/023; B62M 2027/028
See application file for complete search history.

(56) References Cited

U.S. PATENT DOCUMENTS

| 905,704 | A | 12/1908 | Johnson |
| 1,315,360 | A | 9/1919 | Blystad |

(Continued)

FOREIGN PATENT DOCUMENTS

| CA | 2109241 A1 | 2/1995 |
| CA | 2244520 A1 | 1/2000 |

(Continued)

OTHER PUBLICATIONS

Annex to Form PCT/ISA/206 Communication Relating to the Results of the Partial International Search issued by the European Patent Office, dated Mar. 2, 2010, Rijswijk, Netherlands, for a related international PCT Application No. PCT/US2009/066093; 6 pages.

(Continued)

*Primary Examiner* — Jacob D Knutson
(74) *Attorney, Agent, or Firm* — Faegre Drinker Biddle & Reath LLP

(57) ABSTRACT

A snowmobile has an air intake system integrated into the snowmobile body, and with air intake vents facing rearwardly towards the rider. The air intake system includes a plenum defined by a portion of the body and ducting extending within the body. The ducting is porous to allow the air input noise to be dissipated within the engine compartment. The snowmobile further comprises couplings which may be realigned to accommodate wear. A frame coupler allows multiple differently configured frame tubes to be connected to the tunnel. The chassis of the snowmobile includes a casing for receiving the gears which drive the belt.

6 Claims, 32 Drawing Sheets

Related U.S. Application Data division of application No. 14/152,596, filed on Jan. 10, 2014, now Pat. No. 10,358,187.

(56) References Cited

U.S. PATENT DOCUMENTS

| | | | |
|---|---|---|---|
| 1,650,334 A | 11/1927 | Eliason | |
| 3,528,520 A | 9/1970 | Aaron | |
| 3,572,813 A | 3/1971 | Takada | |
| 3,575,474 A | 4/1971 | Russ, Sr. | |
| 3,613,205 A | 10/1971 | Norio | |
| 3,712,416 A | 1/1973 | Swanson et al. | |
| 3,722,961 A | 3/1973 | Haley et al. | |
| 3,732,939 A | 5/1973 | Samson | |
| 3,781,067 A | 12/1973 | Masters et al. | |
| 3,804,455 A | 4/1974 | Gorski | |
| 3,835,948 A | 9/1974 | Duclo | |
| 3,840,082 A | 10/1974 | Olson | |
| 3,840,083 A | 10/1974 | Woods | |
| 3,871,460 A | 3/1975 | Dehnert | |
| 3,901,335 A * | 8/1975 | Johnson | B60K 11/02 180/190 |
| 3,966,004 A | 6/1976 | Rose | |
| 3,981,373 A | 9/1976 | Irvine | |
| 4,046,219 A | 9/1977 | Shaikh | |
| 4,146,101 A | 3/1979 | Plourde | |
| 4,241,929 A | 12/1980 | Curry | |
| 4,491,333 A | 1/1985 | Warnke | |
| D291,344 S | 8/1987 | Jonsson | |
| 4,892,165 A | 1/1990 | Yasui et al. | |
| 5,129,473 A | 7/1992 | Boyer | |
| 5,232,066 A * | 8/1993 | Schnelker | B60K 11/04 180/190 |
| 5,474,146 A | 12/1995 | Yoshioka et al. | |
| 5,533,585 A | 7/1996 | Kawano et al. | |
| 5,568,840 A | 10/1996 | Nagata et al. | |
| 5,685,387 A | 11/1997 | Rioux et al. | |
| 5,700,020 A | 12/1997 | Noble | |
| 5,881,834 A | 3/1999 | Karpik | |
| 5,944,133 A | 8/1999 | Eto | |
| 5,957,230 A | 9/1999 | Harano et al. | |
| 6,012,728 A | 1/2000 | Noble | |
| 6,109,217 A * | 8/2000 | Hedlund | F28F 1/12 123/41.51 |
| 6,227,323 B1 | 5/2001 | Ashida | |
| 6,431,561 B1 | 8/2002 | Hedlund | |
| 6,446,744 B2 | 9/2002 | Wubbolts et al. | |
| 6,604,594 B2 | 8/2003 | Wubbolts et al. | |
| 6,626,444 B2 | 9/2003 | Noble | |
| 6,681,724 B1 * | 1/2004 | Berg | F01P 3/18 123/41.1 |
| 6,682,085 B2 | 1/2004 | Furuhashi et al. | |
| 6,755,271 B1 | 6/2004 | Berg | |
| 6,758,497 B2 | 7/2004 | Bergman | |
| 6,772,852 B2 | 8/2004 | Morin et al. | |
| 6,863,142 B2 | 3/2005 | Corbeil | |
| 6,892,844 B2 | 5/2005 | Atsuumi | |
| 6,926,107 B2 | 8/2005 | Nishijima | |
| RE39,012 E | 3/2006 | Noble | |
| 7,048,293 B2 | 5/2006 | Bedard | |
| 7,055,454 B1 | 6/2006 | Whiting et al. | |
| 7,080,706 B2 | 7/2006 | Vaisanen | |
| 7,124,848 B2 | 10/2006 | Girouard et al. | |
| 7,134,520 B2 | 11/2006 | Yatagai et al. | |
| 7,150,336 B2 | 12/2006 | Desmarais | |
| 7,213,638 B2 * | 5/2007 | Seiler | F28D 1/0443 29/890.03 |
| 7,232,134 B2 | 6/2007 | Ruzewski et al. | |
| 7,252,301 B2 | 8/2007 | Vaelikangas | |
| 7,322,435 B2 | 1/2008 | Lillbacka et al. | |
| 7,328,765 B2 | 2/2008 | Ebert et al. | |
| 7,353,898 B1 | 4/2008 | Bates, Jr. | |
| 7,357,201 B2 | 4/2008 | Jordan | |
| 7,487,975 B2 | 2/2009 | Pryputniewicz | |
| 7,503,568 B2 | 3/2009 | Mehrmann | |
| 7,530,341 B2 | 5/2009 | Carpenter | |
| 7,533,749 B1 | 5/2009 | Sampson et al. | |
| 7,584,821 B2 | 9/2009 | Prior et al. | |
| 7,607,673 B1 | 10/2009 | Vey | |
| 7,775,313 B1 | 8/2010 | Sampson et al. | |
| 7,802,644 B2 | 9/2010 | Brodeur et al. | |
| 7,870,920 B1 | 1/2011 | Dahlgren et al. | |
| 7,942,236 B2 | 5/2011 | Hagiwara | |
| 7,967,106 B2 | 6/2011 | Ross et al. | |
| 7,997,372 B2 | 8/2011 | Maltais | |
| 8,191,665 B1 | 6/2012 | Sampson et al. | |
| 8,201,536 B2 | 6/2012 | Hazelton et al. | |
| 8,381,857 B1 | 2/2013 | Sampson et al. | |
| 8,567,546 B2 | 10/2013 | Berg et al. | |
| 8,733,773 B2 | 5/2014 | Sampson | |
| 8,776,755 B2 | 7/2014 | Muller et al. | |
| 8,919,477 B2 | 12/2014 | Conn et al. | |
| 8,944,204 B2 | 2/2015 | Ripley et al. | |
| 9,022,160 B2 | 5/2015 | Smith et al. | |
| 9,063,832 B2 | 6/2015 | Schlangen et al. | |
| 9,075,699 B2 | 7/2015 | Wetterlund | |
| 9,096,289 B2 | 8/2015 | Hedlund et al. | |
| 9,152,607 B2 | 10/2015 | Wetterlund et al. | |
| 9,352,802 B2 | 5/2016 | Sampson | |
| 9,446,810 B2 | 9/2016 | Ripley | |
| 11,142,286 B2 | 10/2021 | Sampson et al. | |
| 2001/0013687 A1 | 8/2001 | Cormican | |
| 2002/0074752 A1 | 6/2002 | Noble | |
| 2002/0129984 A1 | 9/2002 | Wubbolts et al. | |
| 2003/0047368 A1 | 3/2003 | Morin et al. | |
| 2003/0070854 A1 | 4/2003 | Bergman | |
| 2003/0137117 A1 | 7/2003 | Lund et al. | |
| 2003/0150658 A1 | 8/2003 | Nakano et al. | |
| 2003/0159868 A1 | 8/2003 | Alexander | |
| 2003/0183436 A1 | 10/2003 | Karpik | |
| 2004/0069474 A1 * | 4/2004 | Wu | F28F 3/12 165/185 |
| 2004/0173390 A1 | 9/2004 | Karpik | |
| 2004/0182624 A1 | 9/2004 | Yatagai et al. | |
| 2004/0188160 A1 | 9/2004 | Yoshihara | |
| 2004/0211608 A1 | 10/2004 | Morin et al. | |
| 2004/0262064 A1 | 12/2004 | Lefort | |
| 2005/0034909 A1 | 2/2005 | Vaisanen | |
| 2005/0115700 A1 | 6/2005 | Martin et al. | |
| 2005/0126839 A1 | 6/2005 | Rasidescu et al. | |
| 2005/0173873 A1 | 8/2005 | Ruzewski et al. | |
| 2005/0205322 A1 | 9/2005 | Girouard et al. | |
| 2006/0032686 A1 | 2/2006 | Berg | |
| 2006/0032700 A1 | 2/2006 | Vizanko | |
| 2006/0061051 A1 | 3/2006 | Lemieux | |
| 2006/0108164 A1 | 5/2006 | Wubbolts et al. | |
| 2006/0162976 A1 | 7/2006 | Desmarais | |
| 2006/0170195 A1 | 8/2006 | Valikangas | |
| 2007/0114085 A1 | 5/2007 | Girouard et al. | |
| 2007/0193715 A1 | 8/2007 | Bergman et al. | |
| 2010/0071981 A1 | 3/2010 | Nakamura et al. | |
| 2011/0186371 A1 * | 8/2011 | Berg | B60K 11/04 180/190 |
| 2013/0032420 A1 | 2/2013 | Mills et al. | |
| 2013/0193676 A1 | 8/2013 | Mertens et al. | |
| 2014/0065936 A1 | 3/2014 | Smith et al. | |
| 2015/0375826 A1 | 12/2015 | Sampson et al. | |

FOREIGN PATENT DOCUMENTS

| | | |
|---|---|---|
| CA | 2400127 A1 | 8/2003 |
| CA | 2451017 A1 | 5/2004 |
| FR | 2662610 A1 | 12/1991 |

OTHER PUBLICATIONS

Article 34 Amendment, dated Nov. 15, 2010, for International Application No. PCT/US2009/066110; 15 pages.

Communication Pursuant to Article 94(3) EPC issued by the European Patent Office, dated Nov. 14, 2018, for European Patent Application No. 15700942.4; 4 pages.

(56) References Cited

OTHER PUBLICATIONS

Communication Pursuant to Article 94(3) of the European Patent Convention, dated Feb. 6, 2018, for corresponding European Patent Application No. 15700942.4; 4 pages.

International Preliminary Report on Patentability for International Application No. PCT/US2009/066110; 3 pages.

International Preliminary Report on Patentability for PCT/US2013/025354 issued by the European Patent office, dated Jun. 4, 2014, 18 pages.

International Preliminary Report on Patentability issued by the European Patent Office, dated Jul. 12, 2016, for International Application No. PCT/US2015/010621; 12 pages.

International Preliminary Report on Patentability issued by the European Patent Office, dated Jun. 17, 2016, for related International Patent Application No. PCT/US2015/010623; 20 pages.

International Preliminary Report on Patentability, issued by the European Patent Office, dated Jun. 10, 2008, for International Application No. PCT/US2007/004895; 22 pages.

International Search Report and Written Opinion issued by the European Patent Office for International Application No. PCT/US2013/025354, dated Sep. 18, 2013; 13 pages.

International Search Report and Written Opinion issued by the European Patent Office for PCT/US2015/010621, dated Aug. 12, 2015; 17 pages.

International Search Report and Written Opinion issued by the European Patent Office for PCT/US2015/010623, dated Mar. 24, 2015, 11 pages.

International Search Report and Written Opinion, issued by the European Patent Office, dated Jul. 2, 2010, for International Application No. PCT/US2009/066093; 14 pages.

International Search Report and Written Opinion, issued by the European Patent Office, dated Nov. 6, 2007 for International Application No. PCT/US2007/004895; 20 pages.

International Search Report issued by the European Patent Office, dated Mar. 18, 2010, for related International Patent Application No. PCT/US2009/066110; 5 pages.

Office Action issued by the Canadian Intellectual Property Office, dated Dec. 10, 2021, for Canadian Patent Application No. 3,079,718; 4 pages.

\* cited by examiner

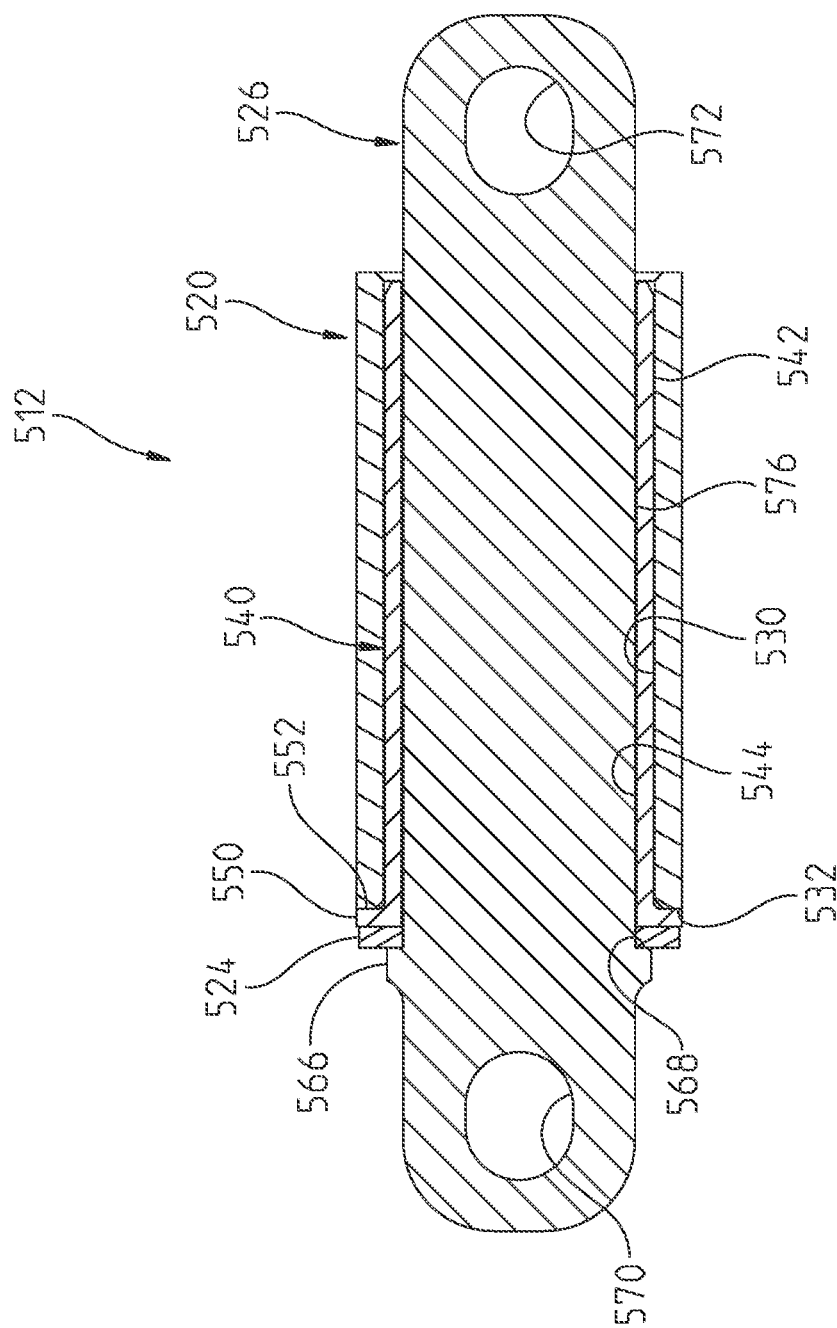

SNOWMOBILE

CROSS-REFERENCE TO RELATED APPLICATIONS

The present application is a continuation of U.S. patent application Ser. No. 16/505,996, filed Jul. 9, 2019, which is a divisional of U.S. patent application Ser. No. 14/152,596, filed Jan. 10, 2014, the complete disclosures of which are expressly incorporated herein.

BACKGROUND

The present application relates to a snowmobile.

The present invention relates to snowmobiles, and more particularly, the present invention relates generally to the frame assembly, suspension assembly, cooling system and air intake system for snowmobiles. The present application incorporates by reference U.S. patent application Ser. No. 13/763,282, filed on Feb. 8, 2013, the subject matter of which is expressly incorporated by reference herein.

One of the performance characteristics of all vehicles, including snowmobiles, includes the noise, vibration and harshness, the so-called NVH of the vehicle. This includes the comfort of the ride, and depends on a variety of systems and components, including the snowmobile suspension. Typically, a snowmobile suspension includes two systems, a front suspension system for a pair of skis and a rear suspension system for the track.

The front suspension of the snowmobile is coupled to the chassis of the snowmobile and to steerable skis. The front suspension may include one or more suspension arms on each side of the snowmobile.

The rear suspension of a snowmobile supports an endless track driven by the snowmobile engine to propel the machine. The track is supported beneath a vehicle chassis by a suspension that is designed to provide a comfortable ride and to help absorb the shock of the snowmobile crossing uneven terrain. Most modern snowmobiles use a slide rail suspension which incorporates a pair of slide rails along with several idler wheels to support the track in its configuration. The slide rails are typically suspended beneath the chassis by a pair of suspension arms, with each arm being attached at its upper end to the chassis of the snowmobile, and at its lower end to the slide rails.

Noise of the vehicle is also a factor. Intake noise has been a concern for snowmobile designs, and includes the intake noise, that is, the noise from the engine caused by the rush of air flow into the combustion chambers of the engine. Some attempts to control the intake noise are done through air intake silencers. Recent designs have become larger and more complicated and it has become difficult to further reduce intake noise due to a lack of volume available in the engine compartment.

SUMMARY

In one aspect, a snowmobile comprises a chassis, comprising a front chassis portion and a rear chassis portion; an engine positioned in the front chassis portion and having at least one intake port and at least one exhaust port; a front body portion defined over the front chassis portion and defining an engine compartment; a plenum assembly coupled to the front chassis portion and having at least one intake air vent and at least one air exit opening; and at least one duct coupled to the air exit opening and communicating air to the air intake, the duct being at least partially comprised of a porous material, whereby sound from the air intake is dissipated in the engine compartment.

In another aspect, a snowmobile comprises a chassis, comprising a front chassis portion and a rear chassis portion; an engine positioned in the front chassis portion and having at least one intake port and at least one exhaust port; a front body portion defined over the front chassis portion and defining an engine compartment, at least one portion of the front body portion being fixed relative to the front chassis and at least one other portion being movable relative to the front chassis; at least one air vent positioned in the fixed front body portion; and an air intake system coupled to the at least one air vent and communicating air through the front body portion to the engine intake port, at least one portion of the air intake system being at least partially comprised of a porous material, whereby sound from the air intake is dissipated through the porous material and into the engine compartment.

In another aspect, a snowmobile comprises a chassis; an engine supported by the chassis; a front suspension coupled to the chassis and to steerable skis; the front suspension comprising at least one suspension arm; and couplings coupling the at least one suspension arm to the chassis, the couplings comprising a movable portion mountable to the chassis in multiple lateral positions, relative to the suspension arm for accommodating wear.

In yet another aspect, a snowmobile comprises a chassis including a bulkhead and a tunnel; an engine supported by the chassis; a coupler attached to the chassis having plural connection points for coupling plural frame braces to the tunnel.

In a further embodiment, a snowmobile comprises a chassis, having a tunnel, an engine cradle and a bulkhead; an engine supported by the chassis; a drive belt supported by the chassis; a drive assembly for driving the drive belt, comprising a jack shaft driven by the engine and a drive shaft for driving the belt; a portion of the chassis including an integrated casing for receiving the jack shaft and drive shaft therein, and for enclosing sprockets attached to the jack shaft and drive shaft.

In yet another aspect, a snowmobile comprises a chassis; a water cooled engine supported by the chassis; and a cooler, the cooler comprising: a top wall, a lower wall, internal ribs connecting the top and lower wall and defining channels, an opening in one of the channels, an insert having an inlet port, an outlet port and a separating rib, the insert being positioned in the opening with the separating rib separating the one channel into two divided channel portions, the inlet port communicating with a first divided channel portion and the outlet port communicating with a second divided channel portion, and side walls positioned between the top and lower wall and enclosing the channels.

An embodiment will now be described by way of reference to the drawing figures.

BRIEF DESCRIPTION OF THE DRAWINGS

FIG. 28 shows a cross-sectional view of the coupler through lines 28-28 of FIG. 26;

DETAILED DESCRIPTION

Figure 1:
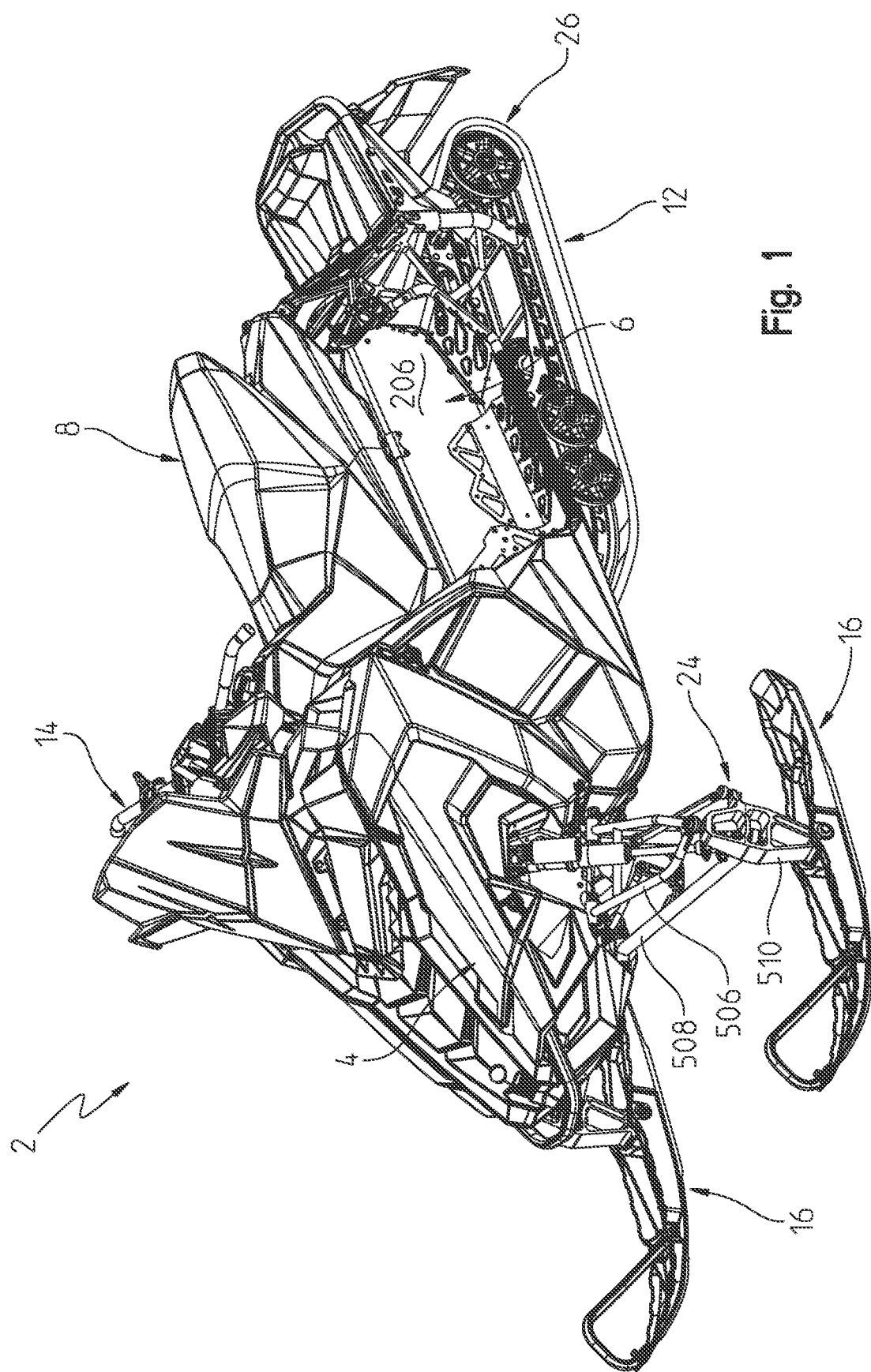
FIG. 1 shows a left front perspective view of a snowmobile according to the present embodiment.
Figure 2:
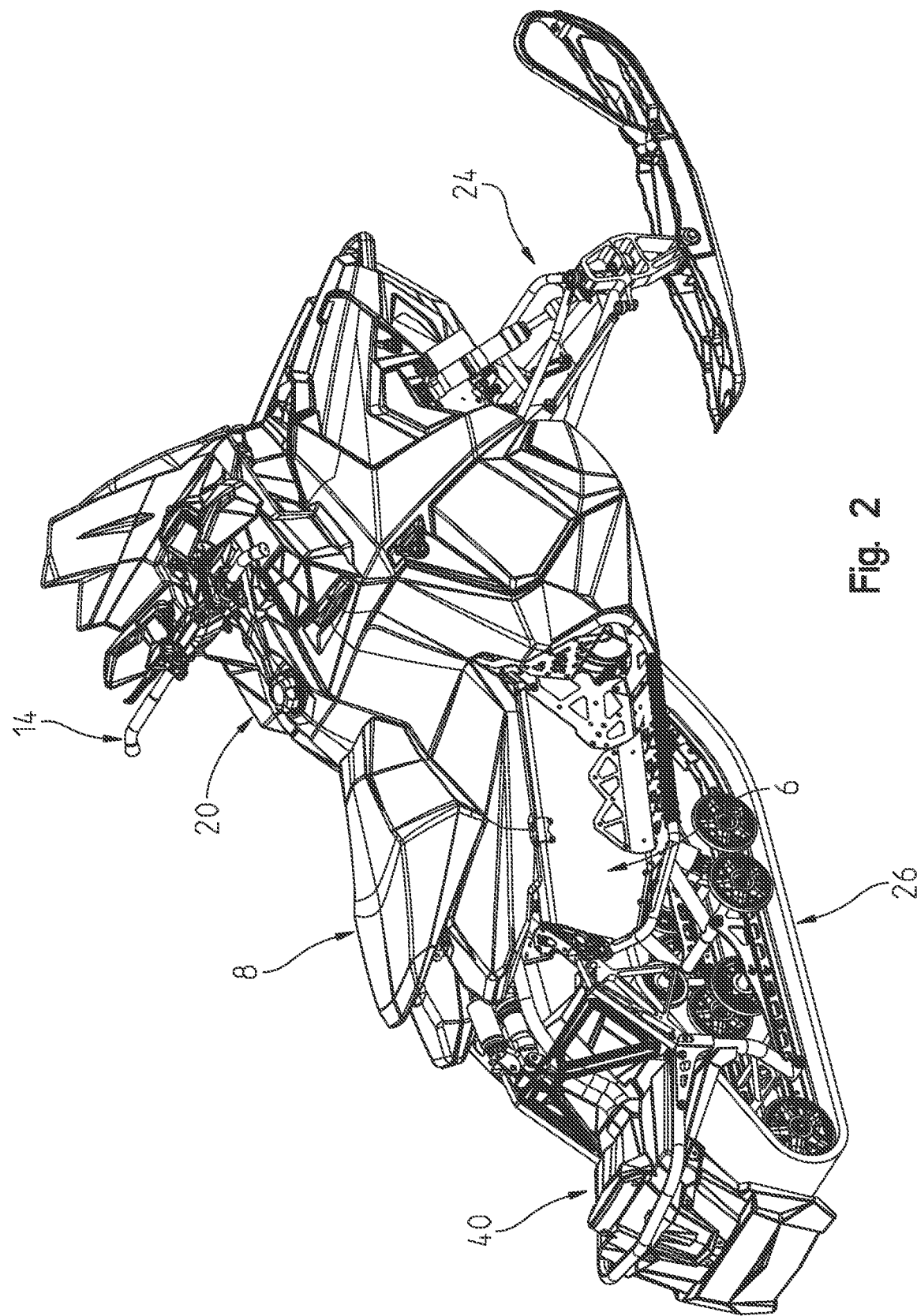
FIG. 2 is a right rear perspective view of the snowmobile of FIG. 1.
Figure 3:
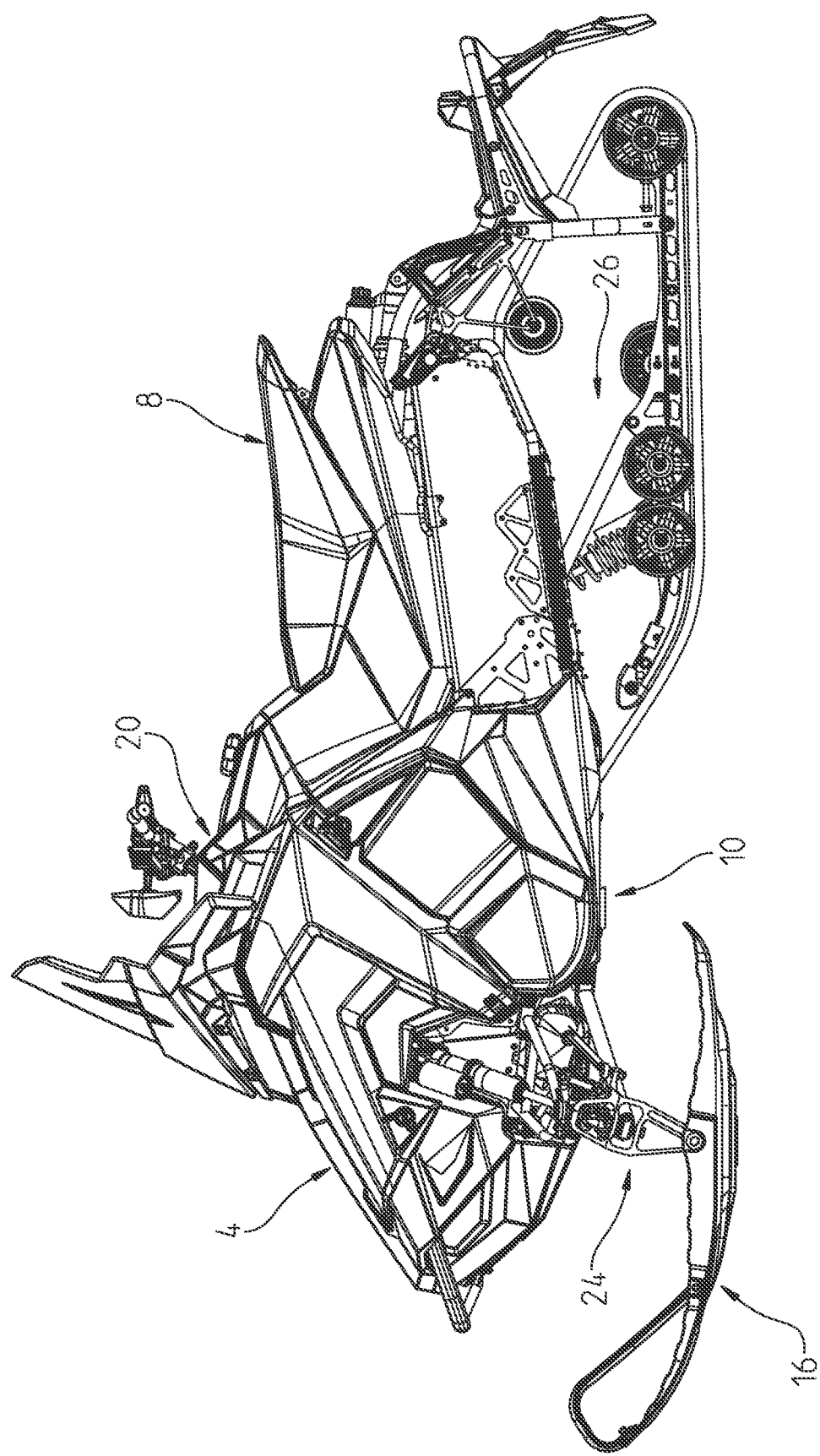
FIG. 3 is a left side view of the snowmobile of FIG. 1.

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

Figure 4:
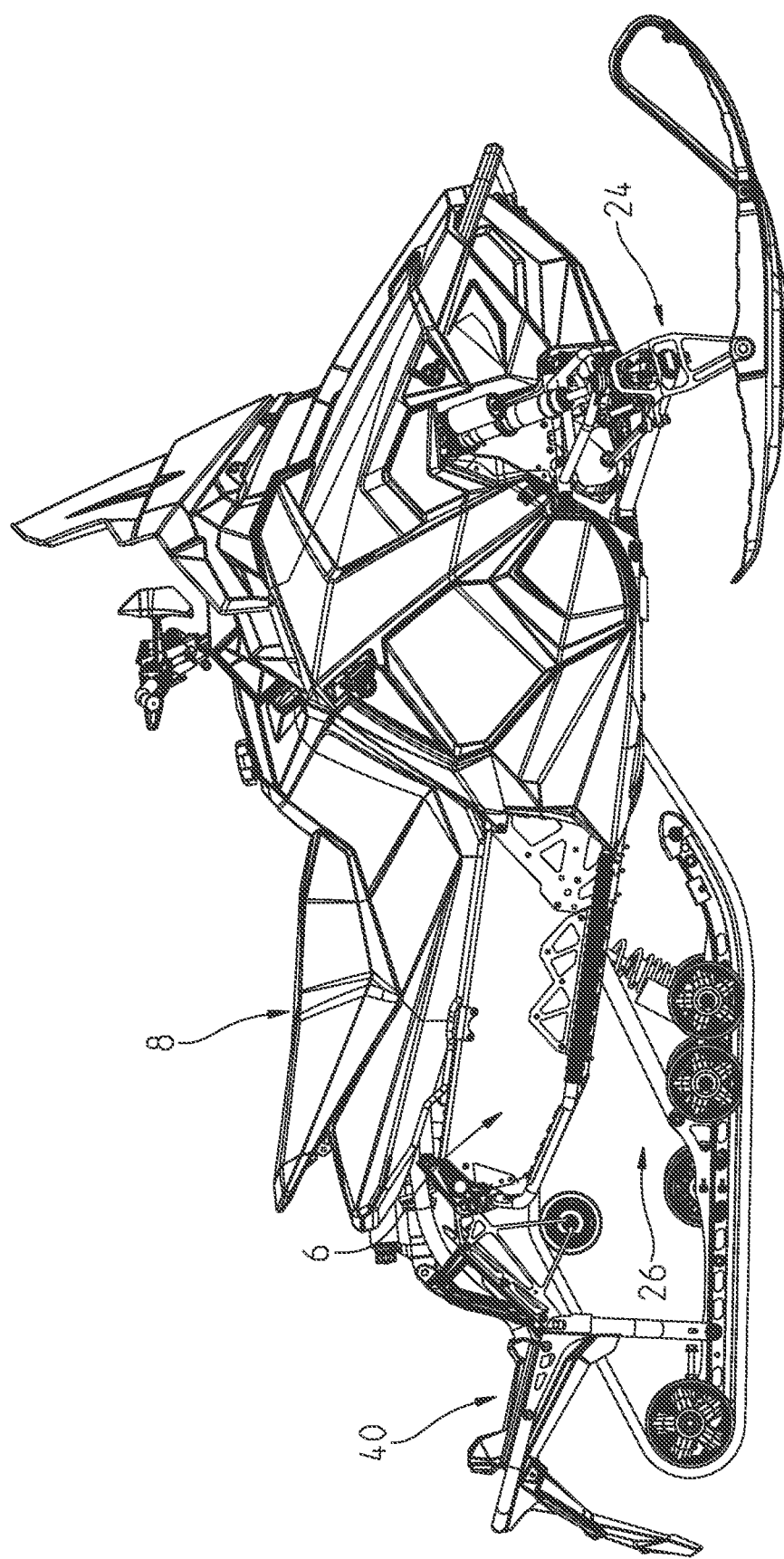
FIG. 4 is a right side view of the snowmobile of FIG. 1.
Figure 5:
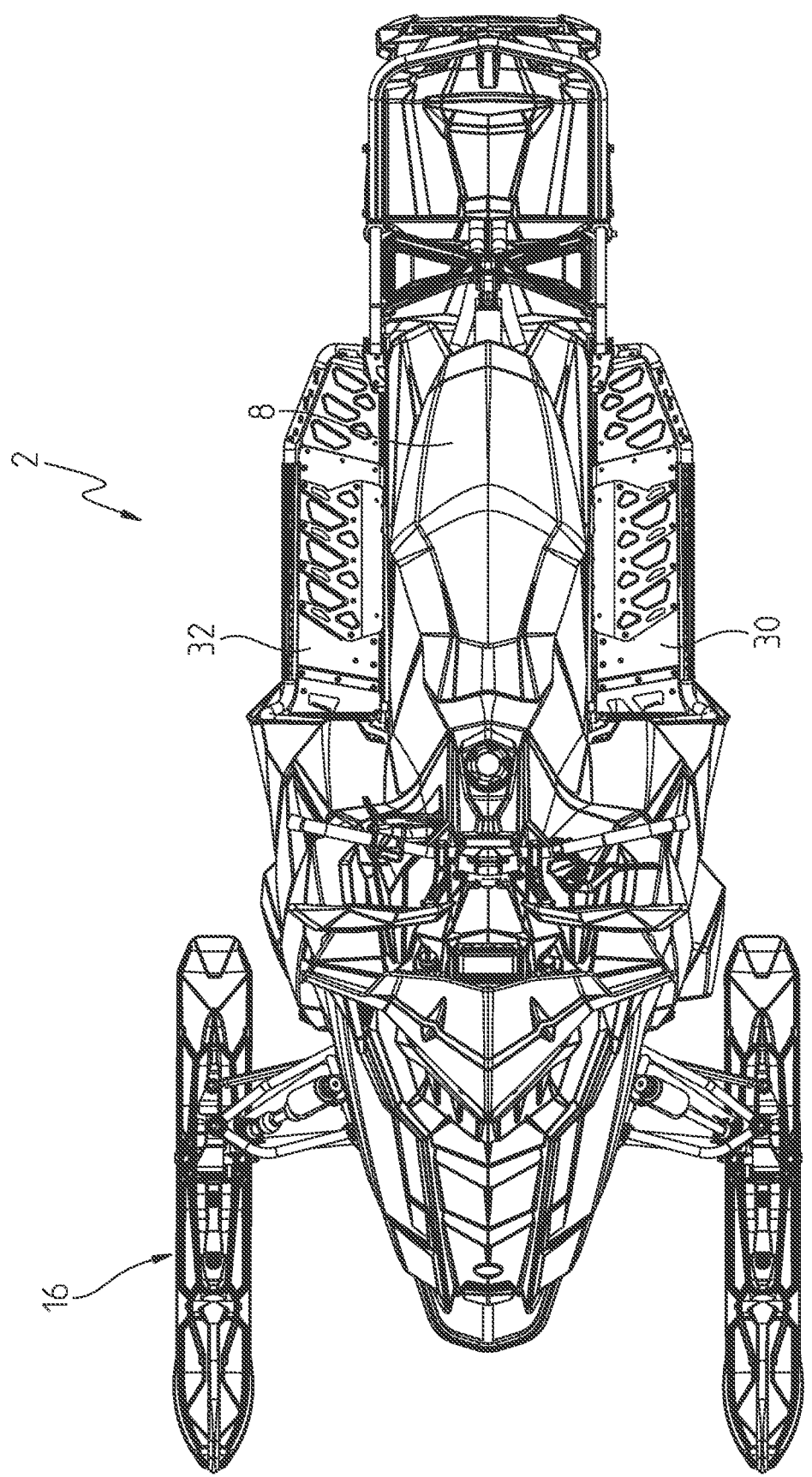
FIG. 5 is a top view of the snowmobile of FIG. 1.
Figure 6:
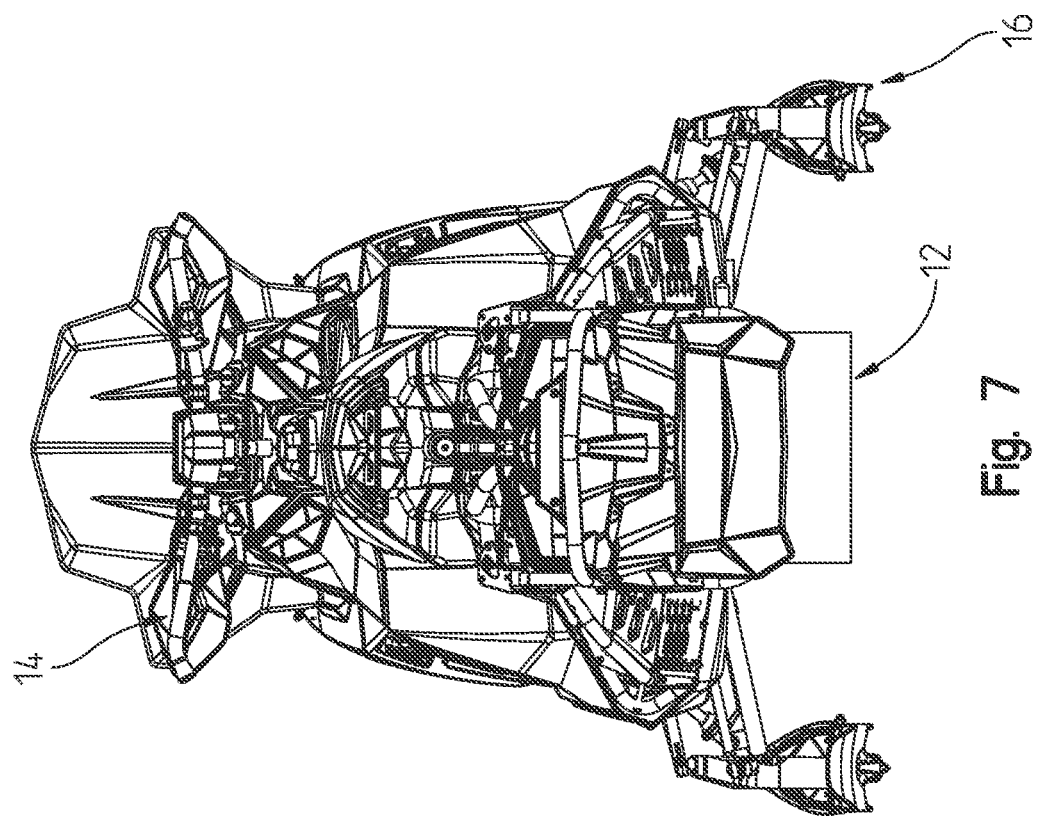
FIG. 6 is a front view of the snowmobile of FIG. 1.
Figure 7:
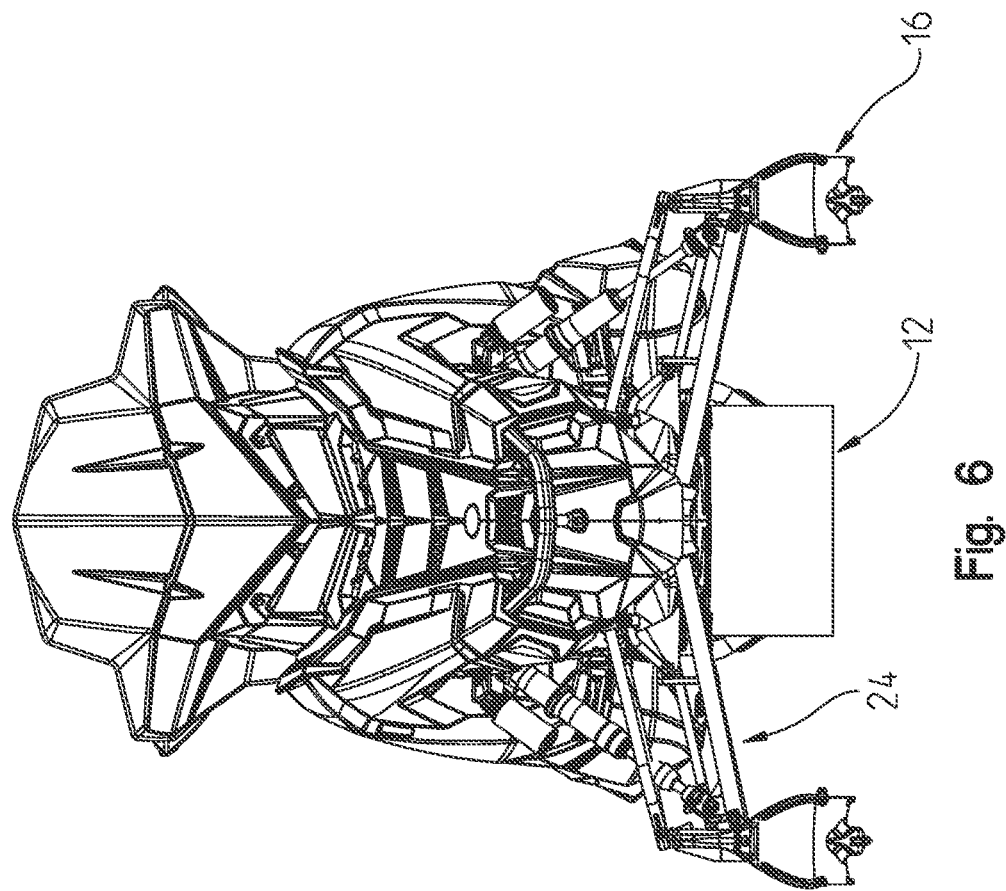
FIG. 7 is a rear view of the snowmobile of FIG. 1.
Figure 29:
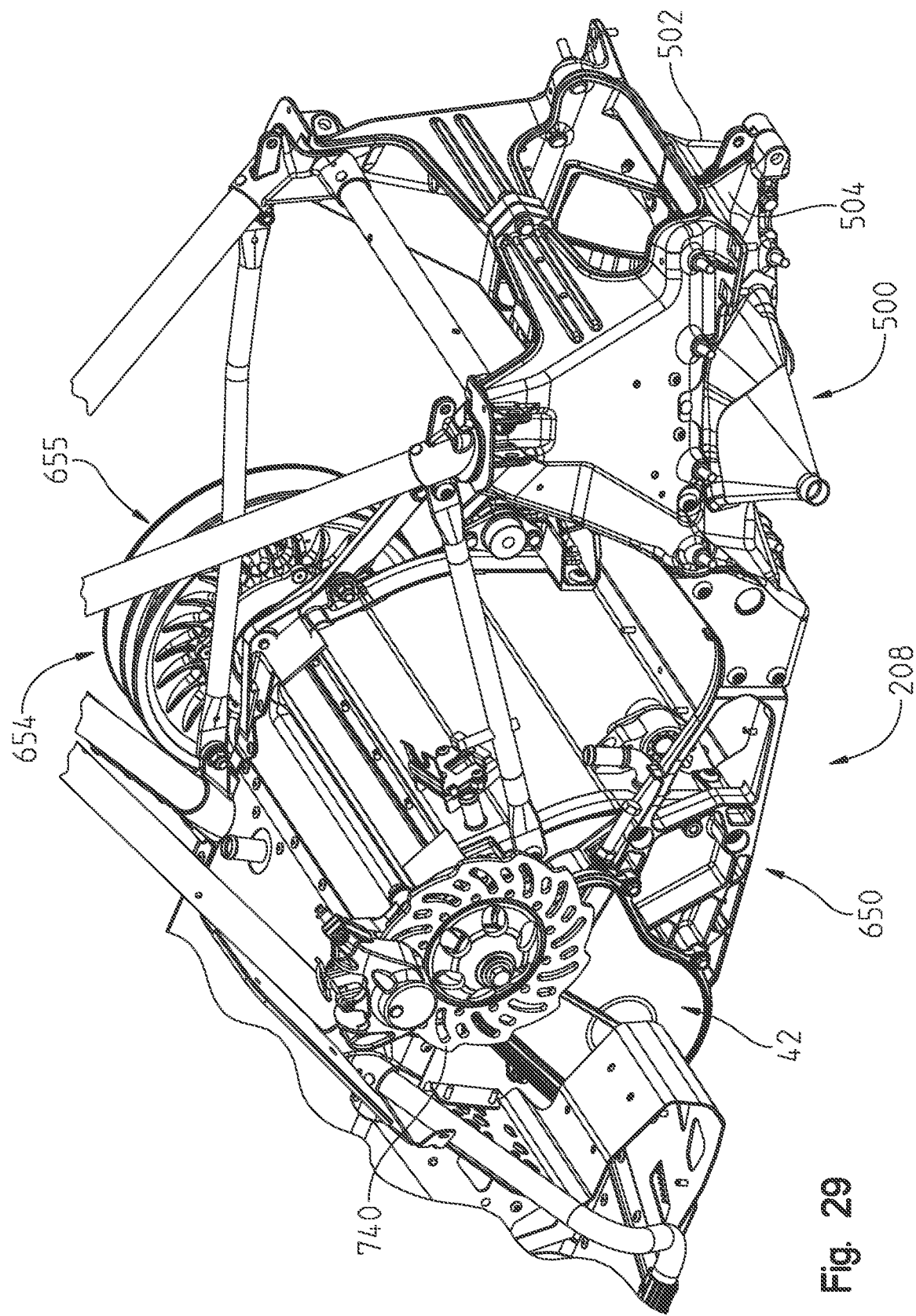
FIG. 29 shows a right side perspective view of the transfer case.

With reference first to FIGS. 1-7, a snowmobile is shown at 2 to generally include a front outer body 4, a frame 6, an operator's seat 8, a propulsion system 10 (FIG. 3) coupled to the frame 6, an endless track 12 coupled to the propulsion system 10 for driving the snowmobile, and a steering system 14 coupled to steerable skis 16. The snowmobile 2 further comprises an air intake system 20 (FIG. 2) coupled to an engine of the propulsion system 10, and front 24 and rear 26 suspensions. Snowmobile 2 further includes left and right footrests 30 and 32 (FIG. 5) for the placement of the left and right feet of a driver while riding. Snowmobile 2 further includes a cooling system including a rear cooling portion 40 (FIG. 4). Cooling system of snowmobile 2 is similar to that shown in U.S. Pat. No. 8,567,546, the subject matter of which is incorporated herein by reference. Snowmobile further includes a snowmobile drive system 42 (FIG. 29).

Figure 8:
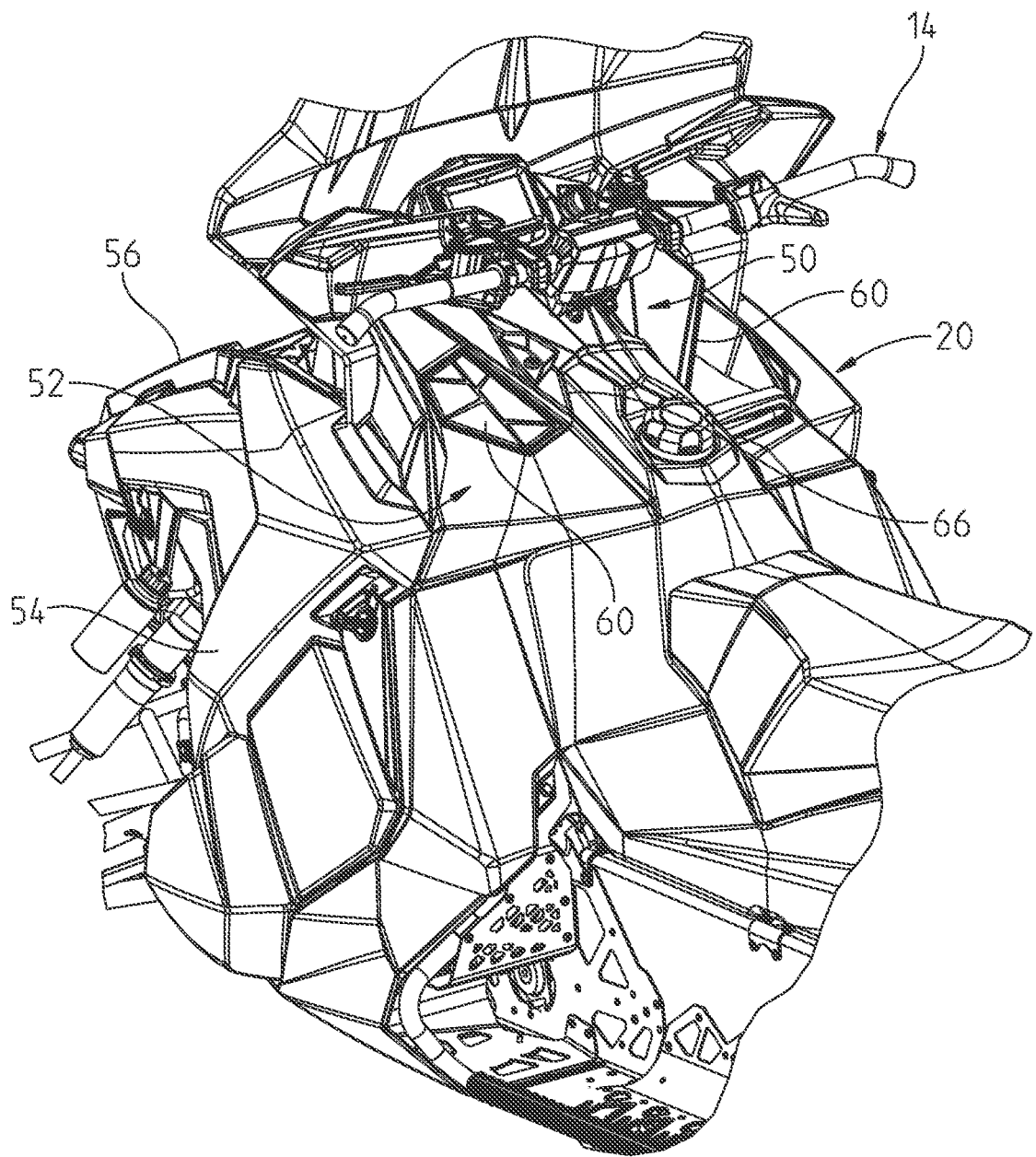
FIG. 8 is a rear fragmented view of the operator's area showing a rear side of the air intake system.
Figure 9:
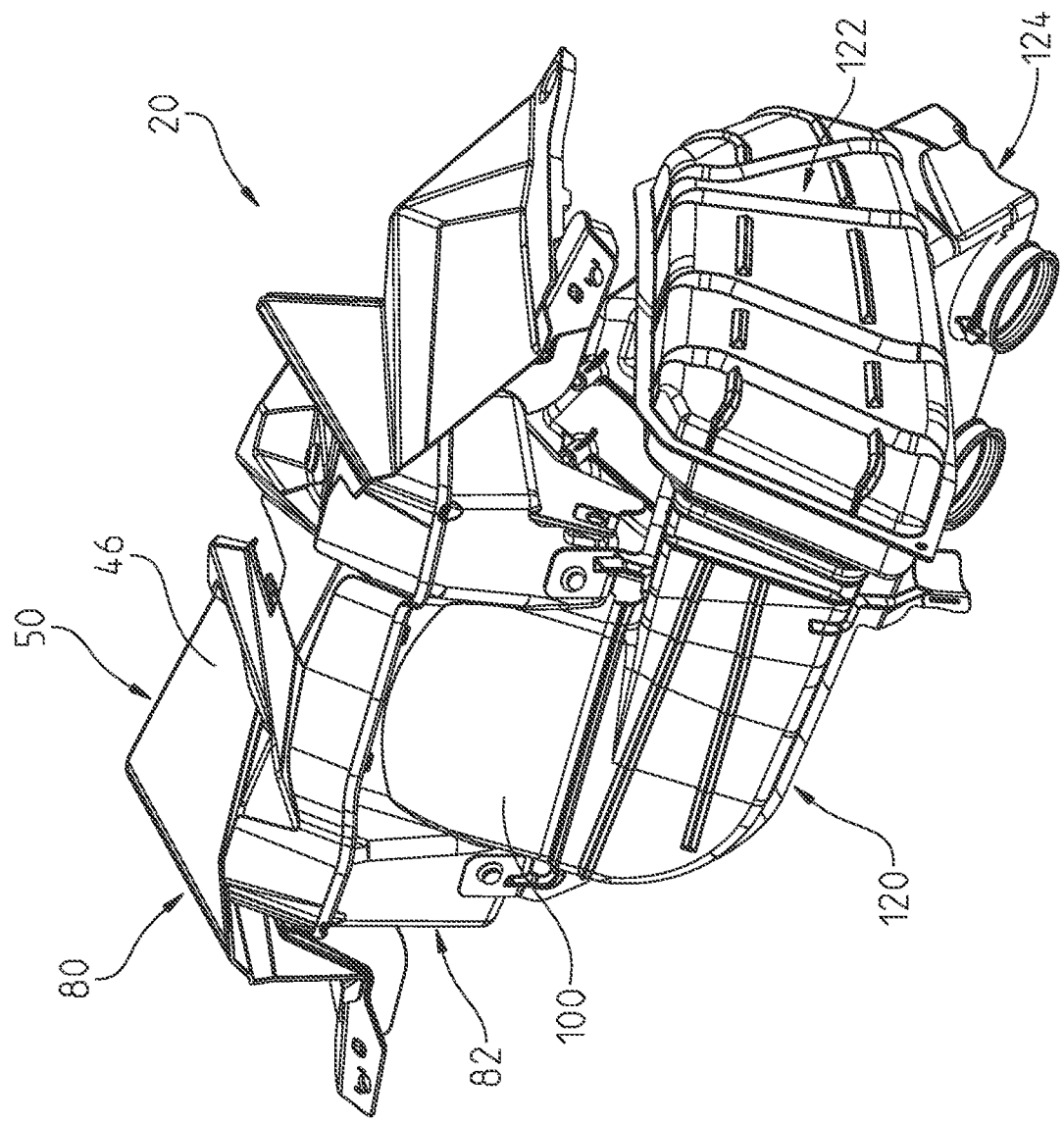
FIG. 9 is a left front perspective view of the air intake system shown removed from the snowmobile.

With respect to FIGS. 8-14, air intake system 20 will be described in greater detail. With reference first to FIGS. 8 and 9, air intake assembly 20 is shown incorporated into the body styling. That is, the front outer body 4 includes an upper body panel 46 (FIG. 9), rear panel 52, side panel 54, and hood 56. The air intake assembly 20 including a plenum assembly 50, which intersects with rear panel 52, side panel 54, and hood 56 in a cohesive fashion, and is partially defined by upper body panel 46. Plenum assembly 50 includes air intake vents 60 as described further herein. The upper body panel 46, rear panel 52, and side panel 54, are fixed relative to the chassis or frame 6, whereas hood 56 is movable relative to frame 6 to access an engine compartment.

Figure 10:
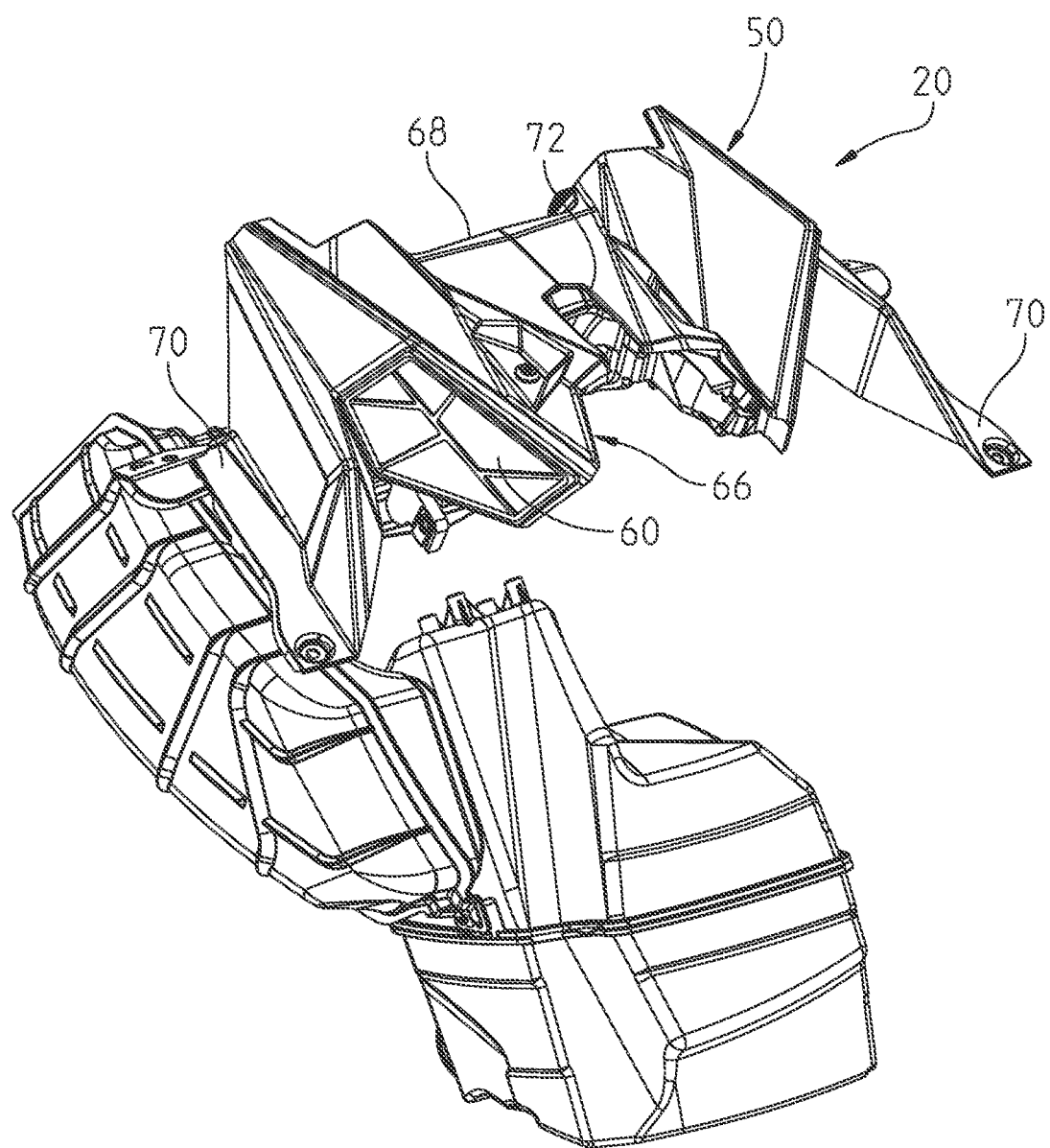
FIG. 10 is left rear perspective view of the air intake system shown removed from the snowmobile.

As shown best in FIG. 10, plenum assembly 50 includes a rear edge 66, which conforms to panel 52 as best shown in FIG. 8. Plenum assembly 50 includes integral brackets at 70 on either side thereof for mounting plenum assembly 50 to the snowmobile frame. A slot 72 is provided to allow access for a steering post of steering assembly 14.

Figure 11:
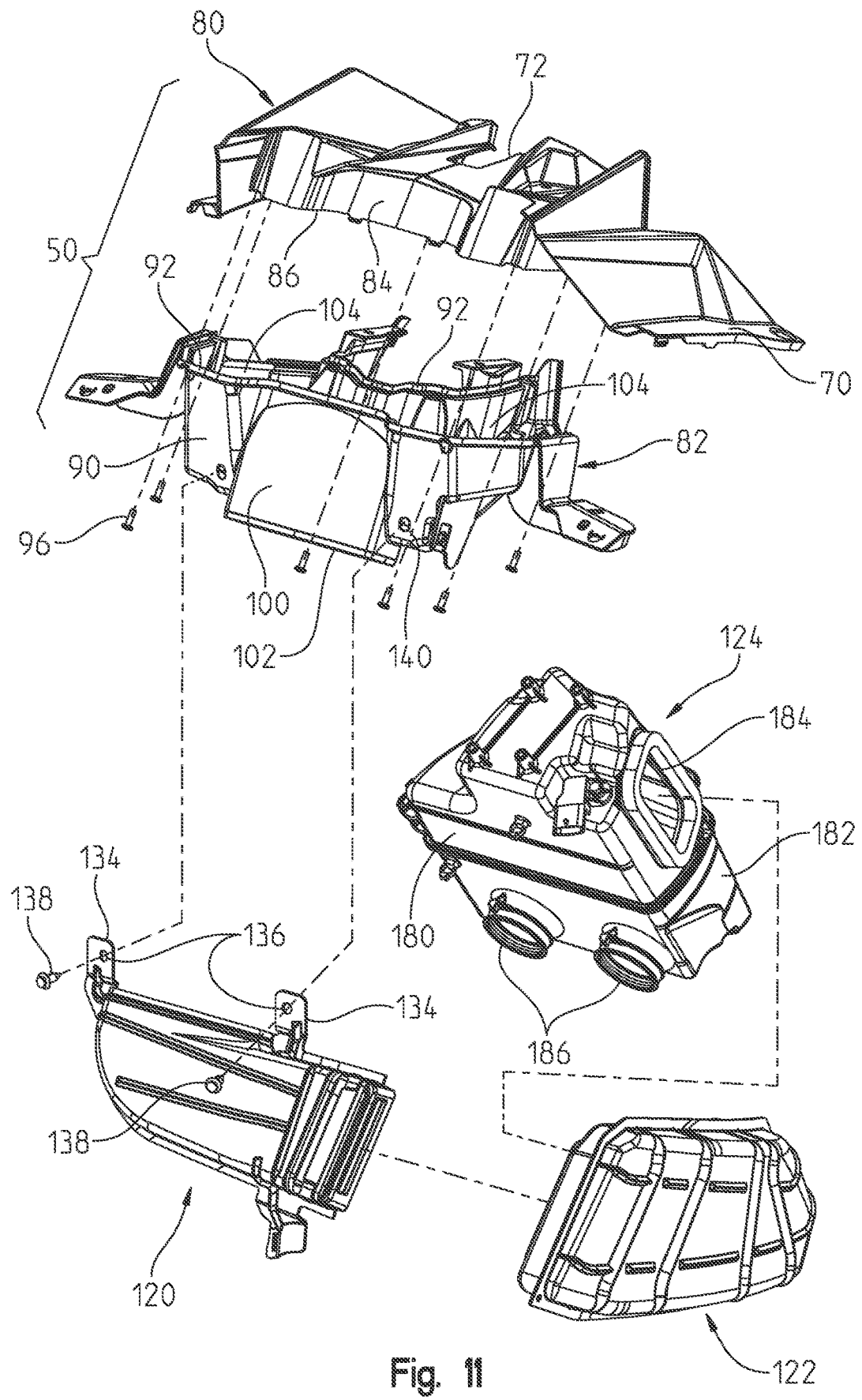
FIG. 11 is left front perspective view of the air intake system shown in an exploded manner.

With reference now to FIG. 11, plenum assembly 50 is shown as having an upper plenum housing 80 and a lower plenum housing 82. Upper plenum housing 80 includes a front wall 84 defining a lower peripheral edge 86. Lower plenum housing 82 includes a perimeter wall 90 defining an upper plenum edge at 92. It should be appreciated that walls 84 and 90 complement each other with edges 86, 92 conforming to provide a sealed plenum housing when coupled together. As shown in FIG. 11, fasteners such as 96 are provided, which are received through lower plenum housing 82 to be received in threaded bosses on an underside of upper plenum housing 80. Lower plenum housing 82 includes an air exit port 100 having an opening at 102 as described herein. It should be appreciated that once coupled together, upper and lower plenum housings 80, 82 provide for a closed air box with the only intakes being provided by vents 60 and the only air exit being provided by opening 102. That is, passageways 104 are created that channel air forwardly from vents 60 to opening 102.

Figure 12:
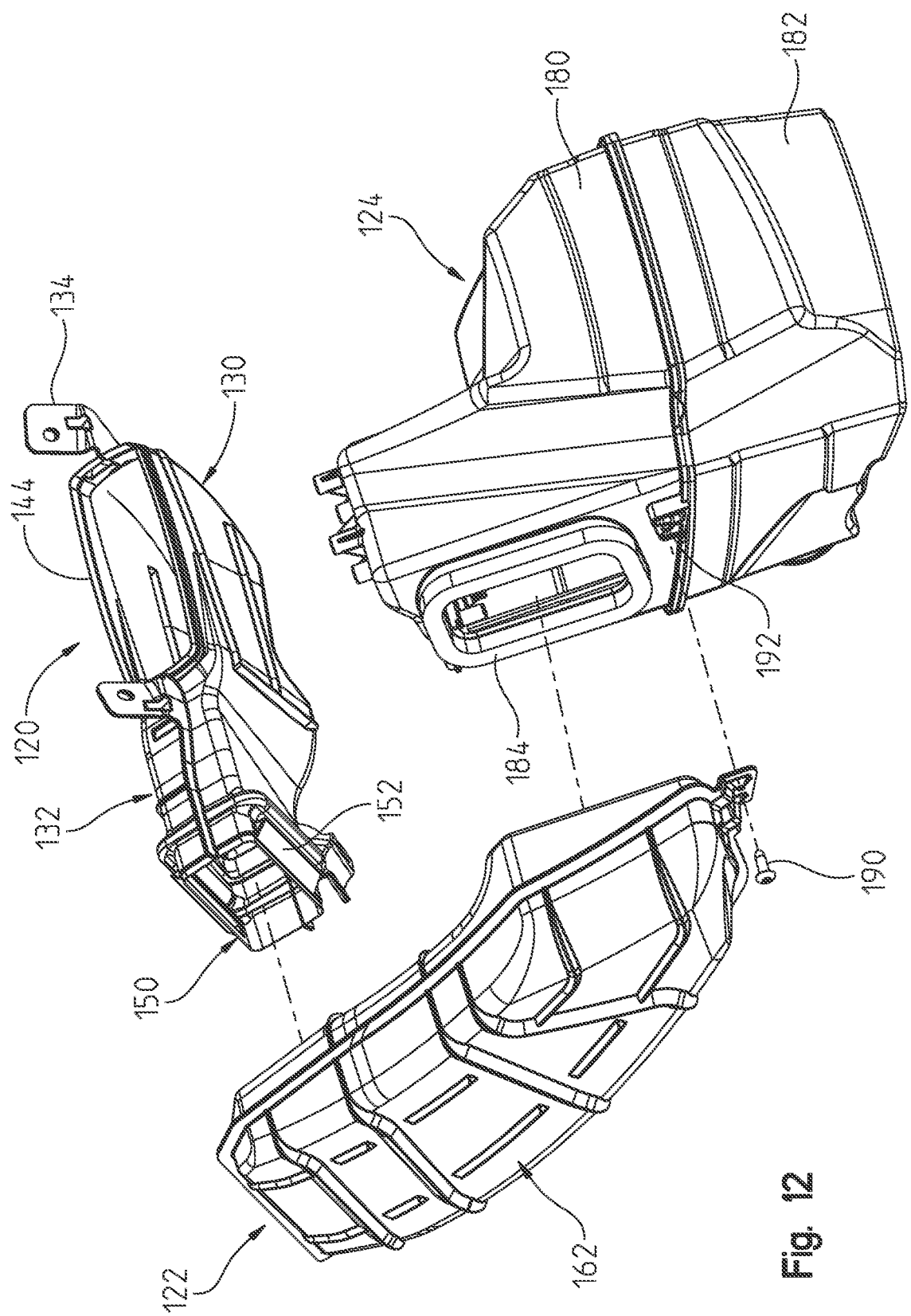
FIG. 12 shows a perspective view of the ducts of the air intake system.

With reference now to FIGS. 9 and 10, the entire air intake system 2—is shown where plenum 50 is shown coupled to a first duct 120, which is coupled to a second duct 122, which in turn, is coupled to air box 124. Ducts 120 and 122 will be described in greater detail with reference to FIGS. 12, 13A and 13B. As shown in FIGS. 12 and 13B, duct 120 includes a molded porous duct portion 130 coupled to a molded porous duct portion 132. As shown, duct portion 130 includes integrated mounting tabs 134, which provide apertures 136 for mounting to lower plenum housing 82. More particularly, and as shown in FIG. 11, fasteners 138 are receivable in apertures 136, which may then be received in threaded bosses 140 of lower plenum housing 82. Duct 120 defines a first opening at 144 (FIG. 12), which corresponds to opening 102 of lower plenum housing 82. A seal may be positioned between openings 102, 144 to better seal the interconnection between the interface of openings 102, 144. Duct 120 further defines an opening at 150 (FIG. 12), which couples to duct 122. Opening 150 is provided with a surrounding latching component 152 having a ramped surface, thereby providing a locking edge when inserted into duct 122 as shown herein.

Figure 13A:
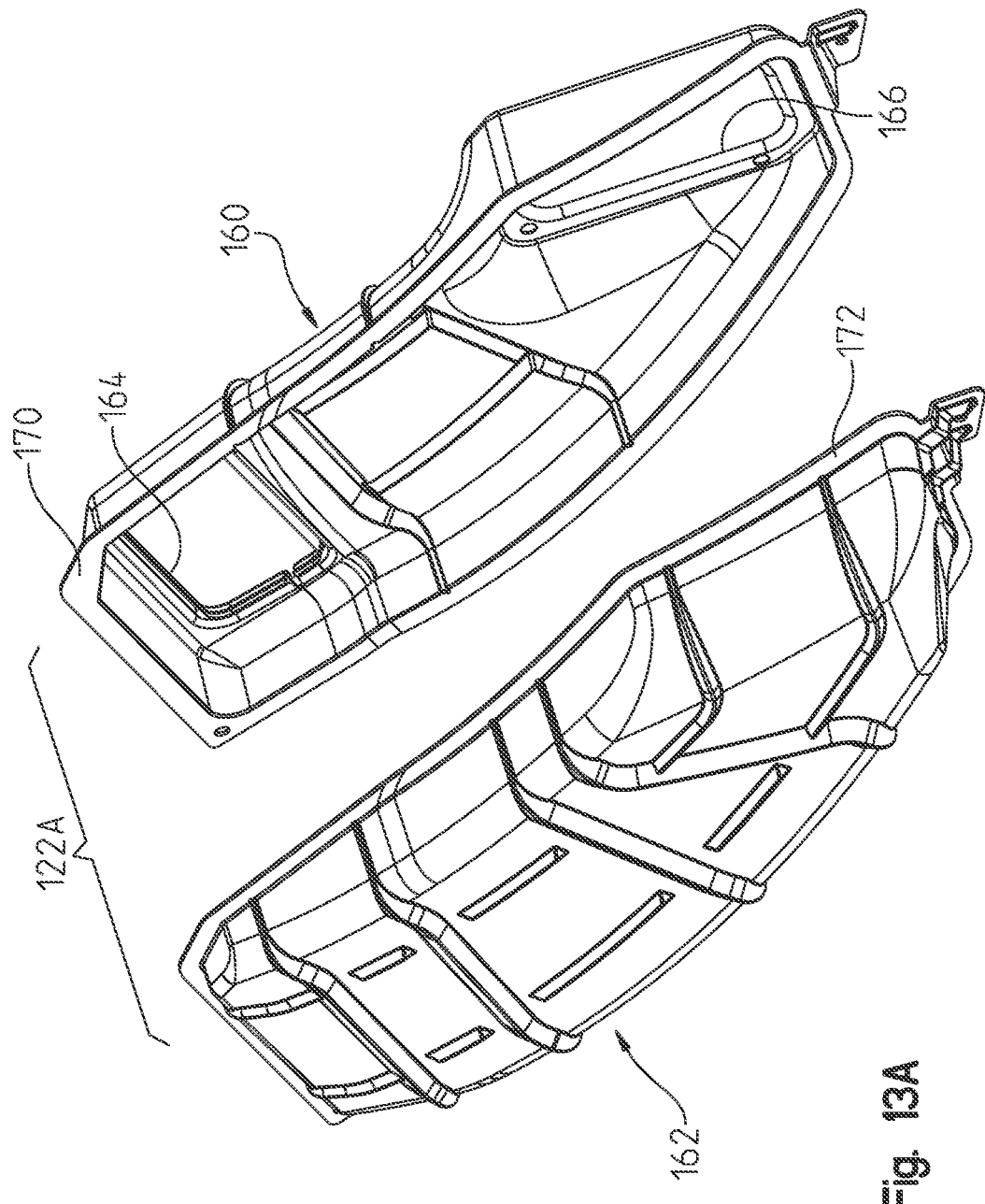
FIG. 13A shows an exploded view of one of the ducts shown in FIG. 12.
Figure 13B:
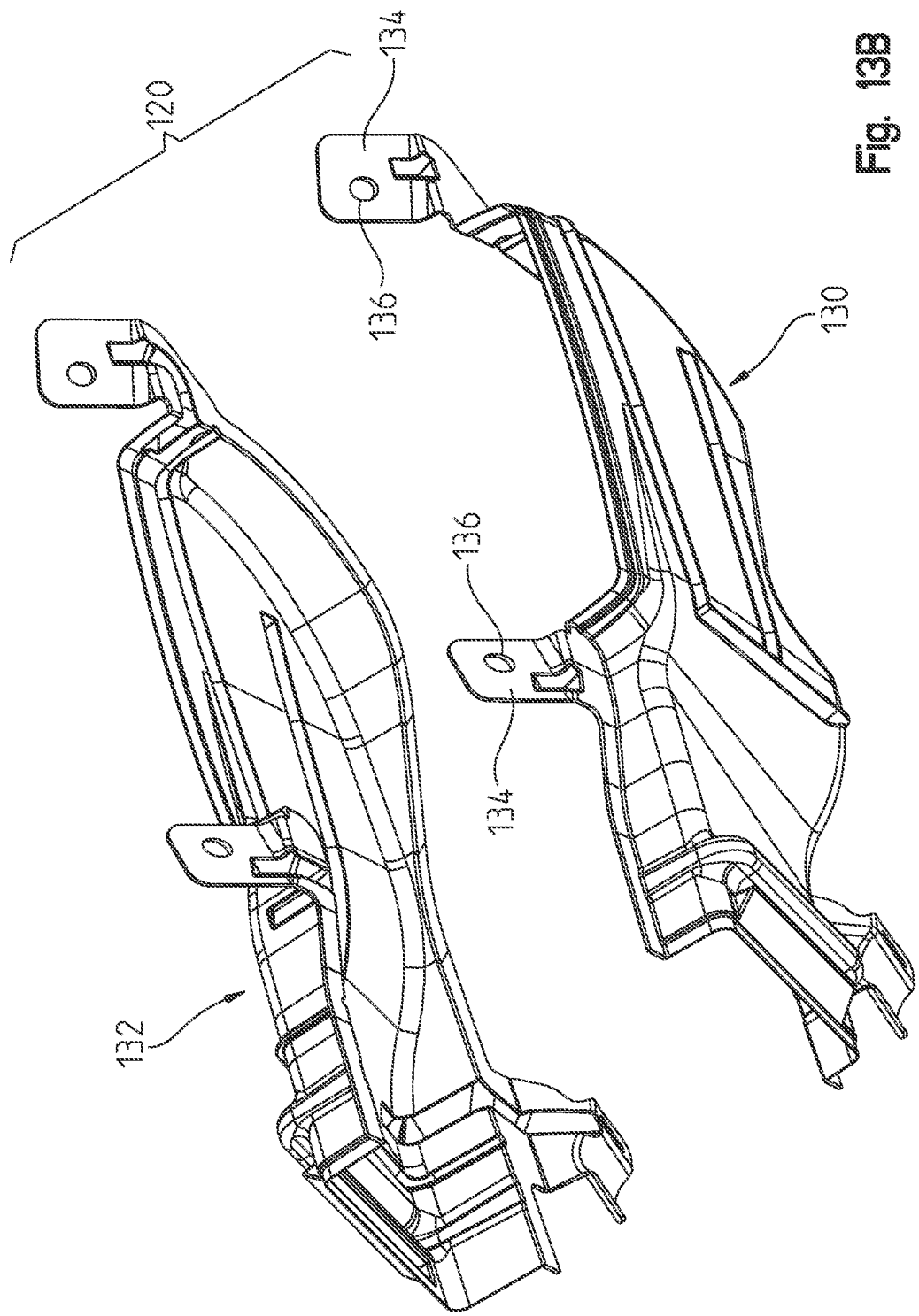
FIG. 13B shows an exploded view of the other of the ducts shown in FIG. 12.
Figure 14:
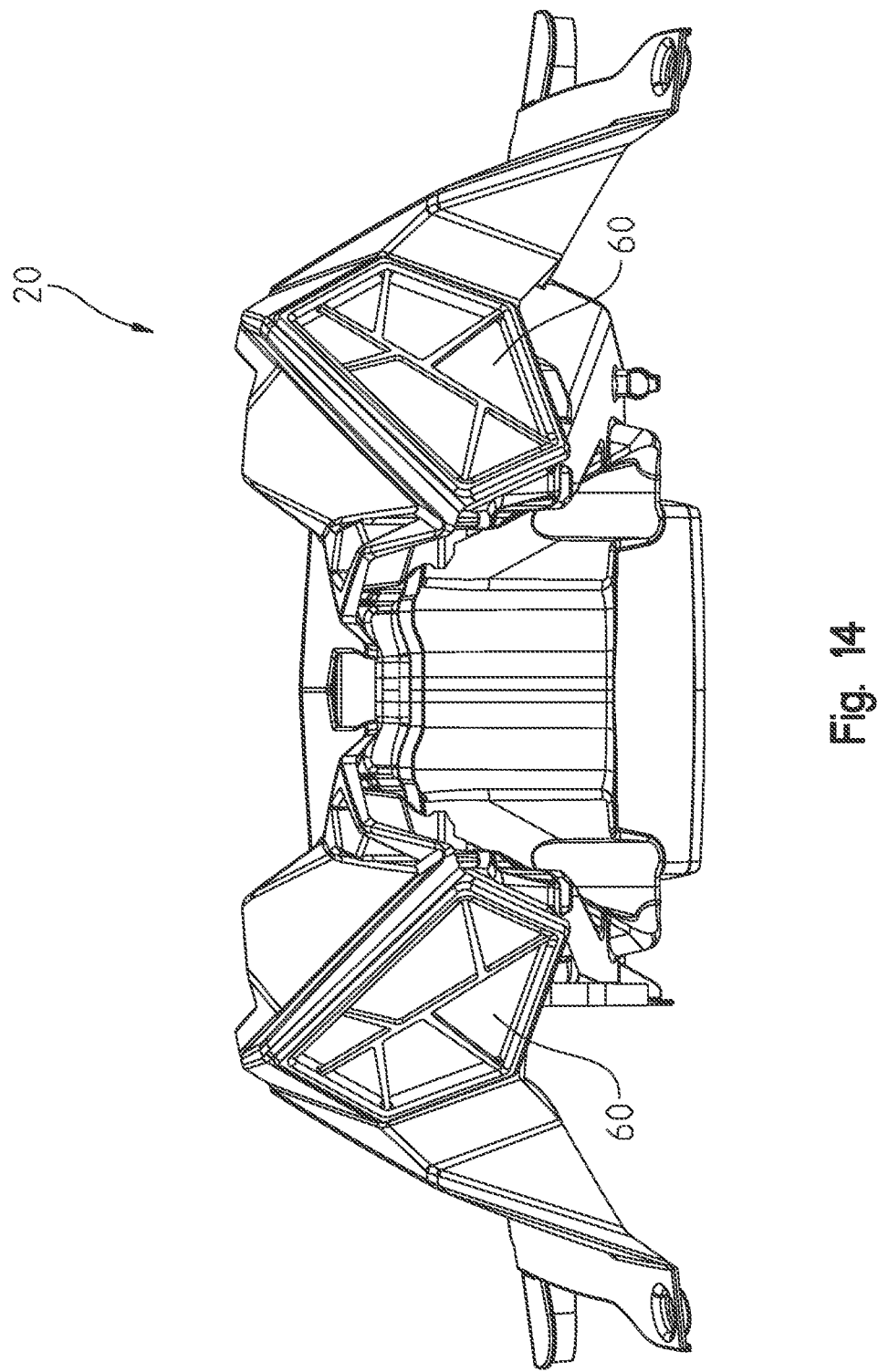
FIG. 14 shows a rear view of the air intake system showing the air vents.

Duct 122 is better shown in FIG. 13A as having a molded porous duct portion 160 and a molded porous duct portion 162. Porous portion 160 includes an opening at 164 to couple with opening 150 on duct 120 and opening 166 to couple with air box 124. Opening 166 is defined by a molded polyethylene portion ultrasonically welded to the porous portion. It should be understood that either duct could include a molded portion (polyethylene or other material) coupled to the porous portion in order to rigidify the duct in any place required. As shown, duct portion 160 includes an outer peripheral flange at 170 and duct portion 162 includes an outer peripheral flange at 172, which is complementary to flange 170. Duct portions 160 and 162 can therefore be coupled, for example, by sonic welding at the flanges 170 and 172.

With reference now to FIGS. 11 and 12, air box 124 will be further described. Air box 124 includes an upper housing portion 180 and a lower housing portion 182. Upper housing portion 180 includes intake opening at 184 and lower housing 182 includes openings 186, which would be coupled to throttle bodies of the snowmobile engine. Duct 122 would be coupled to air box 124 by way of fastener 190 (FIG. 12) attached to threaded boss 192. Air box 124 would include therein an air filter as is known in the art.

The operation of the air intake system 20 will now be described. As mentioned before, and with reference to FIG. 14, air vents 60 allow air to enter plenum 50 of air intake system 20. Air enters the vents 60 and continues into plenum 50. Air exits plenum 50 through opening 102 (FIG. 11) and continues into duct 120. Air exits duct 120 and enters into duct 122 whereupon it enters air box 124. Air exits openings 186 where it is connected to throttle bodies (not shown) and enters through an air intake side of an engine. As the outside portions 132, 162 of ducts 120 and 122 are comprised of a porous material, the sound at the operator's station through the vents is eliminated because the sound is dissipated through the porous material in the engine compartment. Furthermore, the vents face rearwardly towards a rider, but are angled outwardly.

Thus, the vents can be placed along a fixed portion of the snowmobile body without undue sound effects to the operator. For example, most snowmobiles have the engine air intake attached to the hood, which requires a seal between the hood and intake duct. This seal is violated every time the hood is opened requiring correct placement of the hood over the intake duct. This design also eliminates additional resonators and/or Hemholtz boxes in the engine compartment allowing increased volume for other essential engine components.

It has been found that the best performance is achieved where the material of duct portions 132 and 162 have a porosity of 30%; however, the sound dissipation is substantially improved with porosity within the range of 20-40%. Suitable materials for the porous materials could include ultra-high molecular weight polyethylene (UHMWPE), polyester (PET)+polypropylene (PP), high-density polyethylene (HDPE), polypropylene (PP), polytetrafluoroethylene (PTFE), and polyvinylidene fluoride (PVDF). Ethylene vinyl acetate (EVA), polyethersulfone (PES), polyurethane (PU) and PE/PP co-polymer could also be used. In the embodiment shown, the material chosen is a polyester (PET)+polypropylene (PP).

Figure 15:
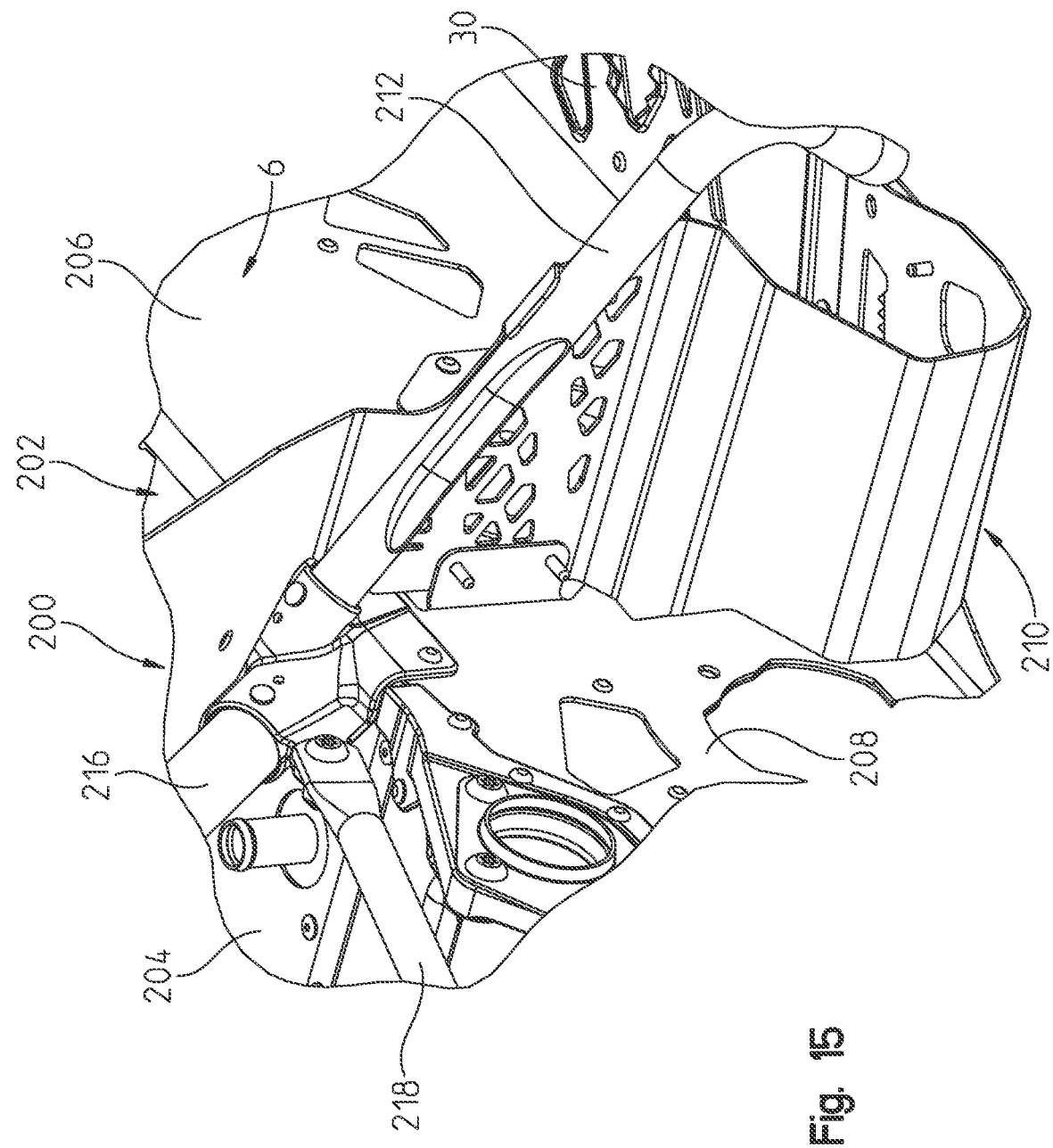
FIG. 15 shows a portion of the snowmobile frame.

As shown best in FIGS. 15-17, a portion of the frame will now be described in detail. As shown best in FIG. 15, a frame coupler 200 is shown providing coupling attachment to multiple components. As shown in FIG. 15, frame 6 is shown as including a tunnel 202 having a top wall 204 and sidewall 206 to which foot rest 30 is attached. Engine cradle 208 extends forwardly from tunnel 206. Toe clip 210 extends forwardly from footrest 30 and is rigidified by a brace at 212. A mainframe tube 216 extends upwardly to a steering arm and brace 218 extends forwardly to another frame component.

Figure 16:
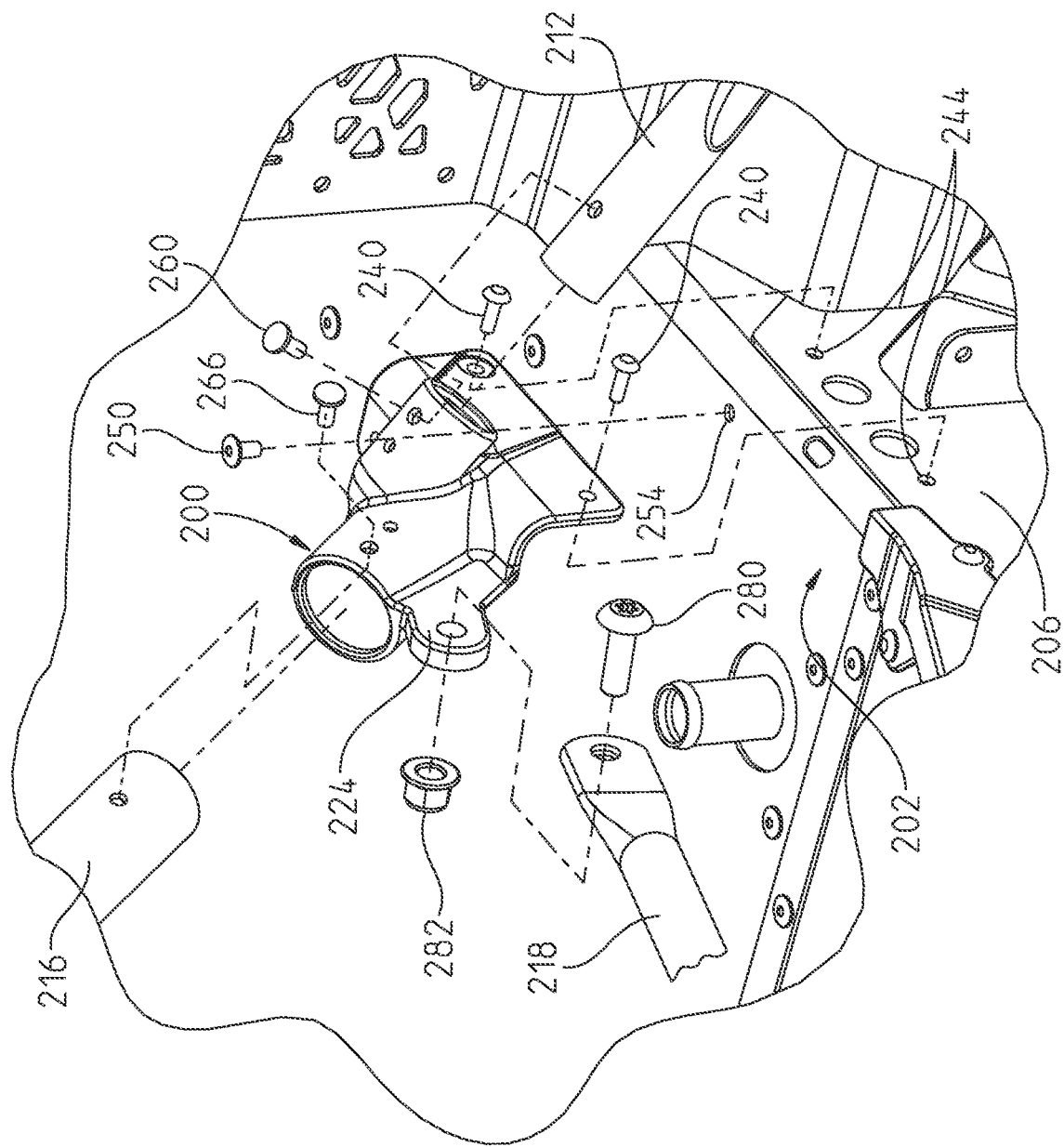
FIG. 16 shows a view of the snowmobile frame of FIG. 15, showing the frame components exploded away from a frame coupler.
Figure 17:
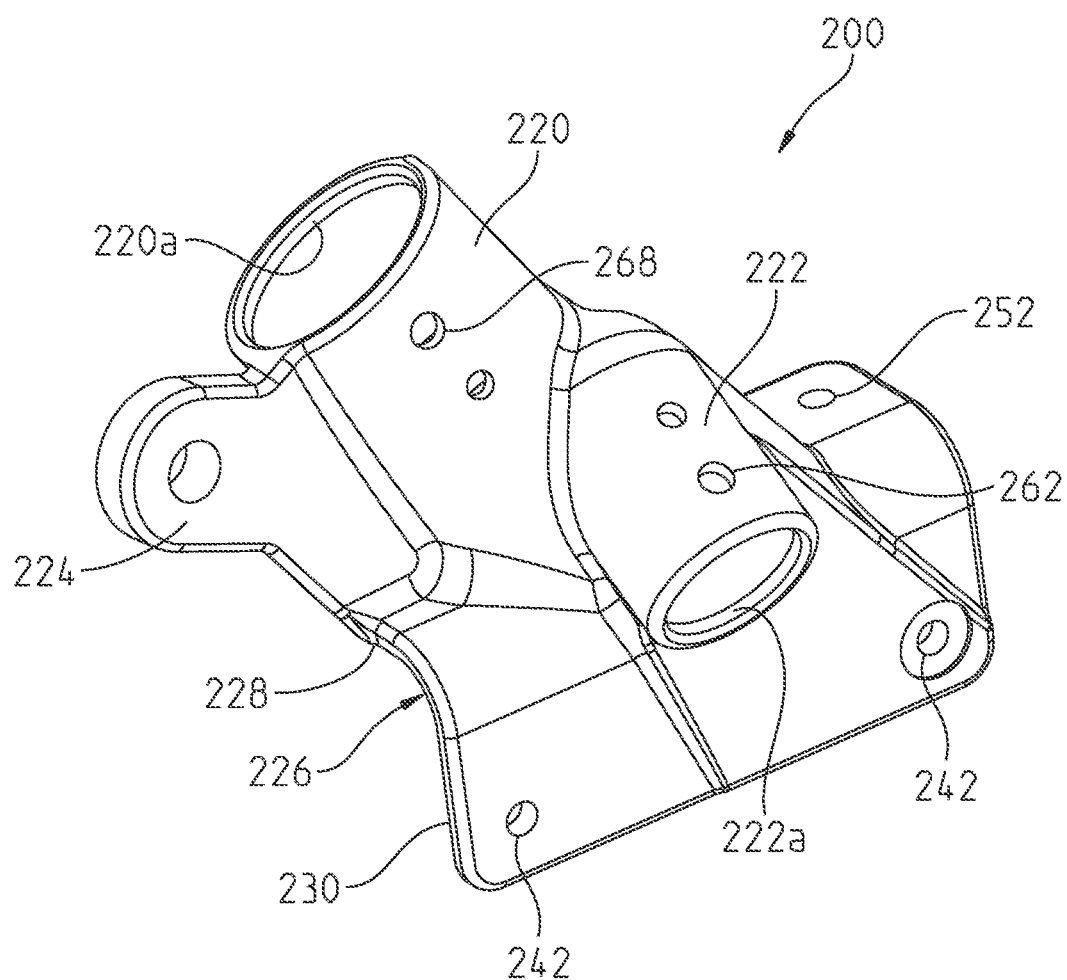
FIG. 17 shows the frame coupler of FIG. 16 in greater detail.
Figure 18:
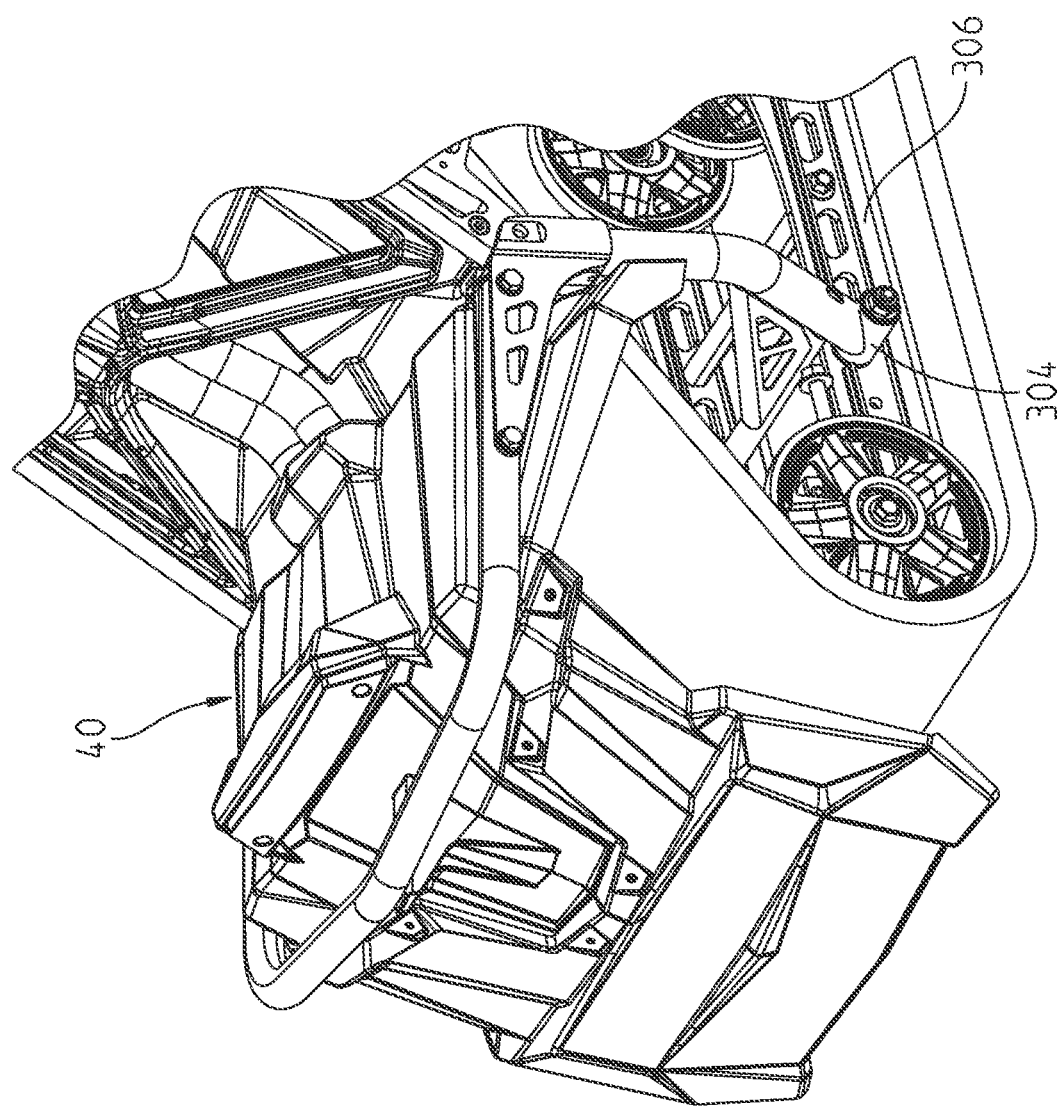
FIG. 18 shows a rear perspective view of the rear suspension and cooling system.

As shown in FIGS. 16 and 17, coupler 200 includes an upwardly extending tubular connection at 220; a downwardly extending tubular coupler at 222; a forwardly extending tab 224; and an L-bracket at 226. L-bracket 226 includes a horizontal bracket portion 228 and a vertical bracket portion 230. As shown in FIG. 16, coupler 200 is coupled to tunnel 202 by way of fasteners 240 (FIG. 16) through apertures 242 (FIG. 17) and into apertures 244 (FIG. 16) on tunnel sidewall 206. Fastener 250 is received through aperture (FIG. 17) 252 and through aperture 254 (FIG. 16) on tunnel top wall 204. Tube 212 can thereafter be received in opening 222a of coupler 222 (FIG. 17) and fastener 260 can be received through aperture 262. In a like manner, tube 216 can be positioned in opening 220a of coupler 220 and fastener 266 can be received through aperture 268. It should be appreciated that the coupling of tubes 212 and 216 into corresponding opening 222a and 220a could include the use of a bonding adhesive. Finally, strut 218 can be coupled to tab 224 by way of fasteners 280, 282 (FIG. 16). Thus coupler 200 allows for the coupling of multiple different frame components, even different sized tubes 212, 216.

Figure 19:
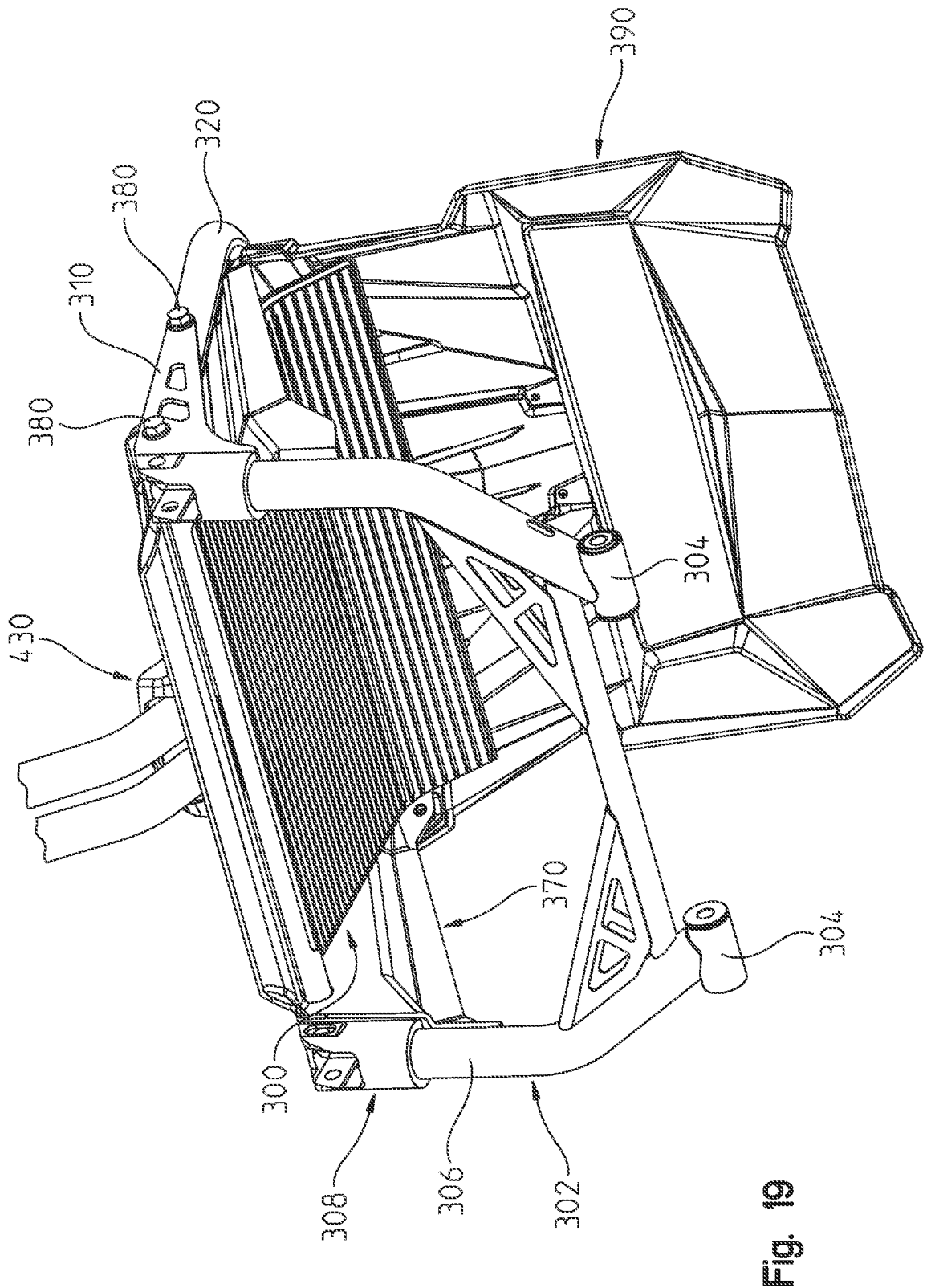
FIG. 19 shows an underside perspective view of the rear cooler.
Figure 20:
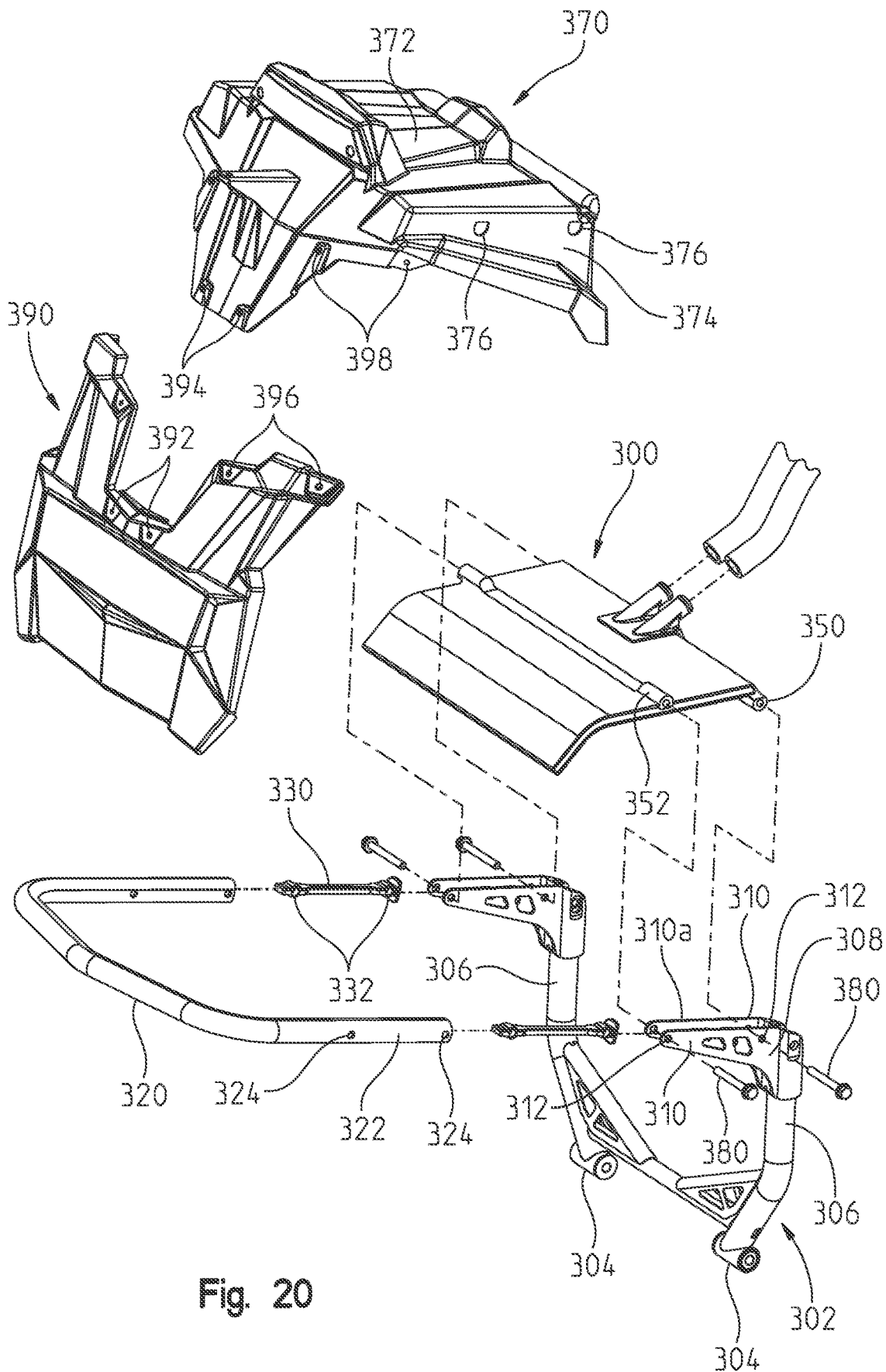
FIG. 20 shows a view similar to that of FIG. 18, in an exploded manner.
Figure 21:
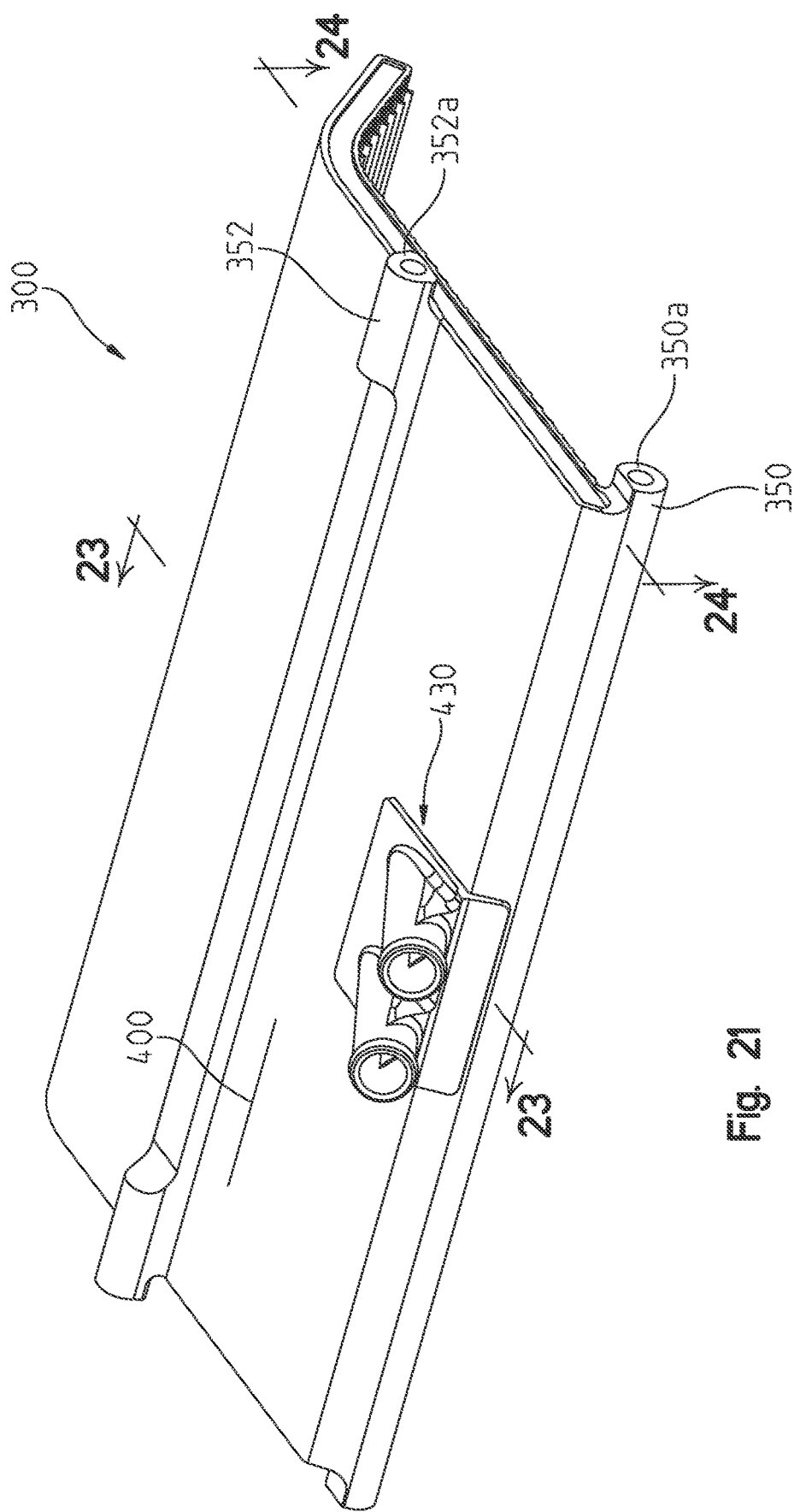
FIG. 21 shows a left front perspective view of the cooler.

With reference now to FIGS. 18-24, the rear cooling portion 40 will be described in greater detail. As shown in FIGS. 19-20, the rear cooling portion 40 includes a rear cooler 300, which is shown coupled to a rear control arm 302 of rear suspension. Rear control arm 302 includes lower couplings at 304 attached to upright tubes 306, which couple with brackets 308. Each bracket includes spaced apart plates 310 having apertures 312 there through. A rear bumper 320 is provided having forwardly extending tubes 322 having apertures 324. An insert spacer 330 is provided having apertures at 332. Cooler 300 includes threaded bosses 350 and 352, which are aligned with apertures 312. Rear snow flap 370 includes an upper cover portion 372 and sidewalls at 374, sidewalls 374 including clearance opening at 376.

Rear cooler 300 is assembled to rear control arm 302 by installing insert spacers 330 into the end of tubes 322 to align apertures 324 and 332. Tubes 322 are then positioned intermediate plates 310 of bracket 308 and fasteners 380 may be inserted through apertures 312, 332 and 324. Rear flap 370 is then positioned over cooler 300 with apertures 376 aligned with apertures 350 and 352. Apertures 350 and 352 are then aligned with fasteners 380; and fasteners 380 may be inserted and threadably received in threaded bosses 350 and 352. As shown best in FIG. 21, a portion of threaded boss extends beyond an end of the cooler 300, which defines end-faces 350a and 352a protruding from a side edge of the cooler 300. Thus, end surfaces 350a and 352a project through apertures 376 and may be flushly received against side surface 310a (FIG. 20) such that bracket 308 is fixed firmly against cooler 300 with apertures 376 only providing clearance for bosses 350, 352. A rear flap 390 may be attached to rear snow flap 370 by way of fasteners through corresponding apertures 392, 394 and 396, 398.

Figure 24:
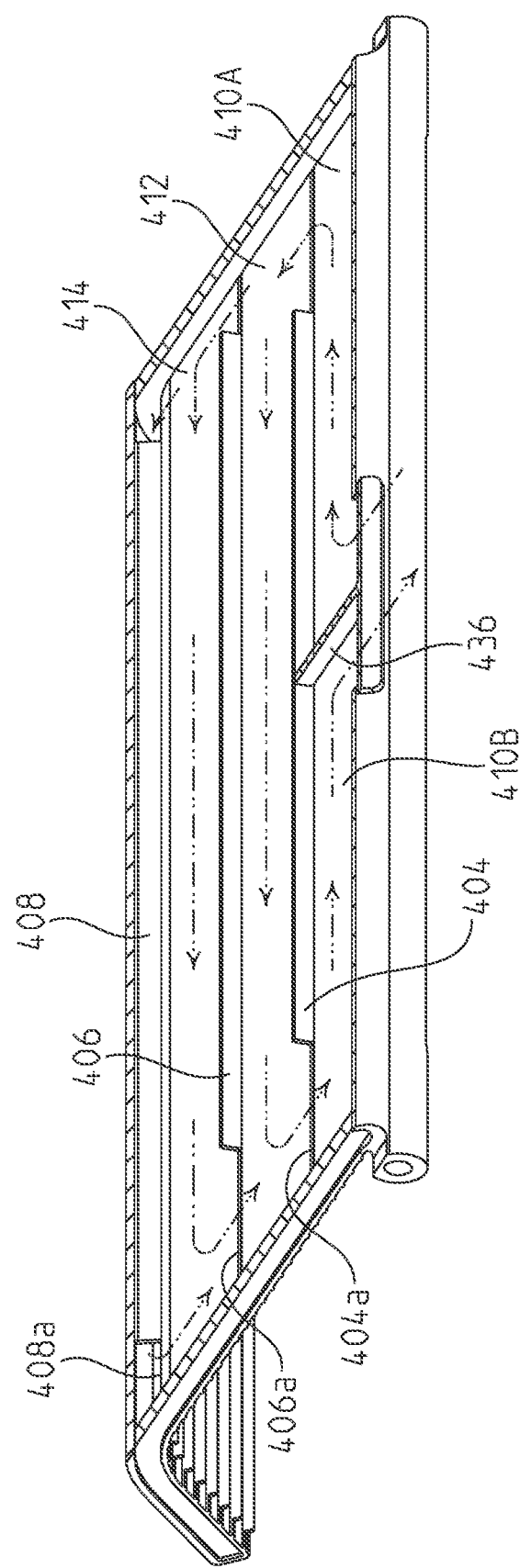
FIG. 24 shows a cross-sectional view of the cooler through lines 24-24 of FIG. 21.

With reference now to FIGS. 21-24, cooler 300 will be described in greater detail. Cooler 300 is generally comprised of an extrusion extruded along an axis 400. The extrusion defines internal ribs 404, 406 and 408, defining channels 410A, 410B, 412, 414, and 416. The extrusion process also defines a plurality of fins at 418. As shown best in FIG. 22, cooler 300 includes an insert at 430 defining an inlet at 432, an outlet at 434 and a separating rib 436 (see FIGS. 23 and 24) intermediate the inlet 432 and outlet 434. Insert 430 further includes a top plate 440 and a front plate 442. An opening 444 may be cut in cooler 300 to receive insert 430 whereby divider rib 436 is positioned in channel 410 dividing the channel into inlet and outlet portions 410A, 410B. As shown in FIG. 24, portions of the ribs 404, 406, and 408, are cut away at 404a, 406a, and 408a (at each end) thus defining passageways between each of the channels.

Figure 22:
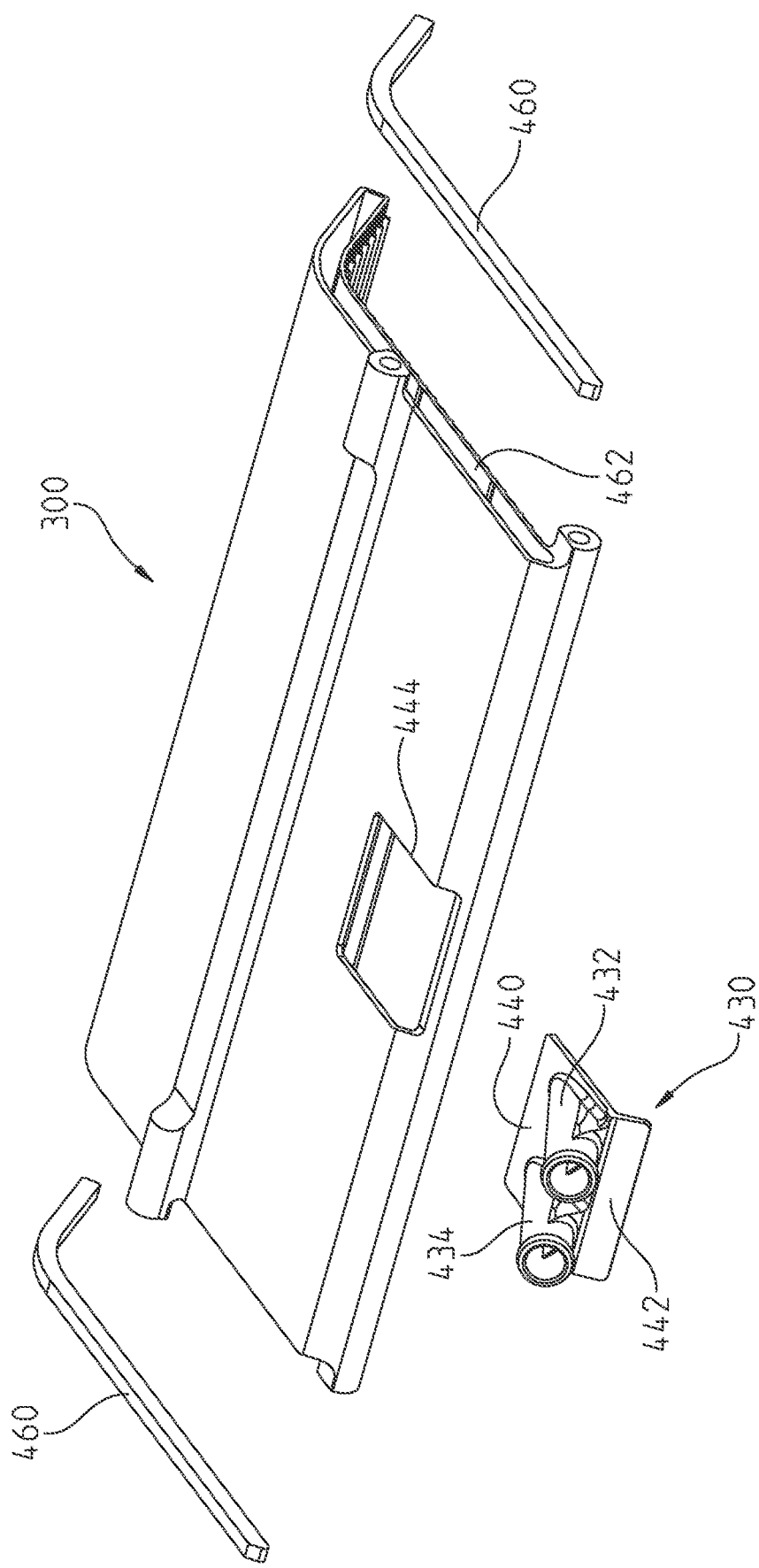
FIG. 22 shows an exploded view of the cooler of FIG. 21.
Figure 23:
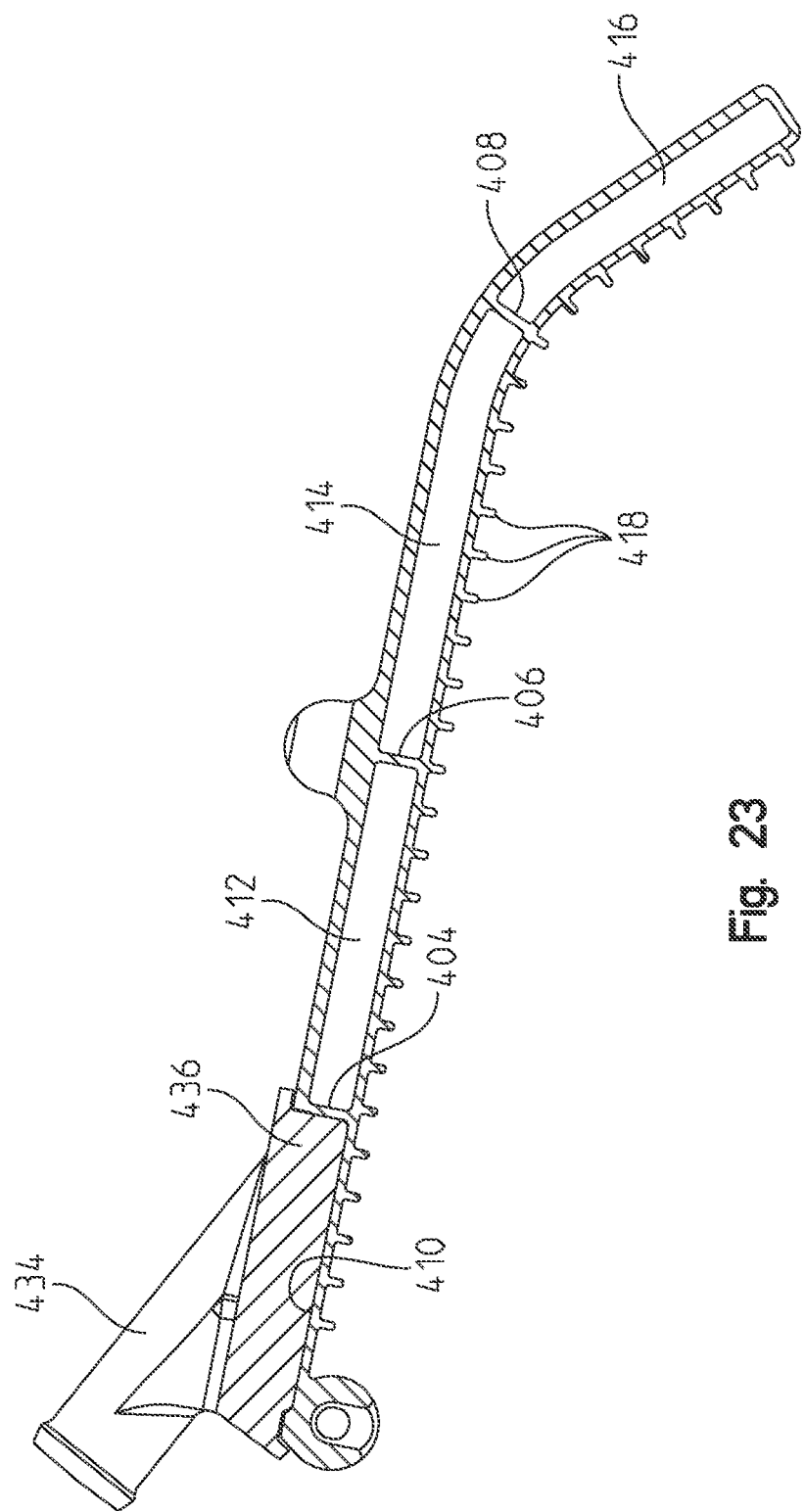
FIG. 23 shows a cross-sectional view of the cooler through lines 23-23 of FIG. 21.

Therefore, and with reference still to FIG. 24, water may flow into channel 410A and into any of channels 412, 414, or 416, and be returned to channel 410B and exit through outlet 434 (FIG. 22). End plates 460 may be positioned into openings 462 and held in place by adhesive or welding or any other means known in the art.

With reference now to FIGS. 25-28, front suspension 24 will be described in greater detail. Front suspension 24 is similar to the front suspension shown and described in U.S. Pat. No. 8,225,896, the subject matter of which is incorporated herein by reference.

Figure 25:
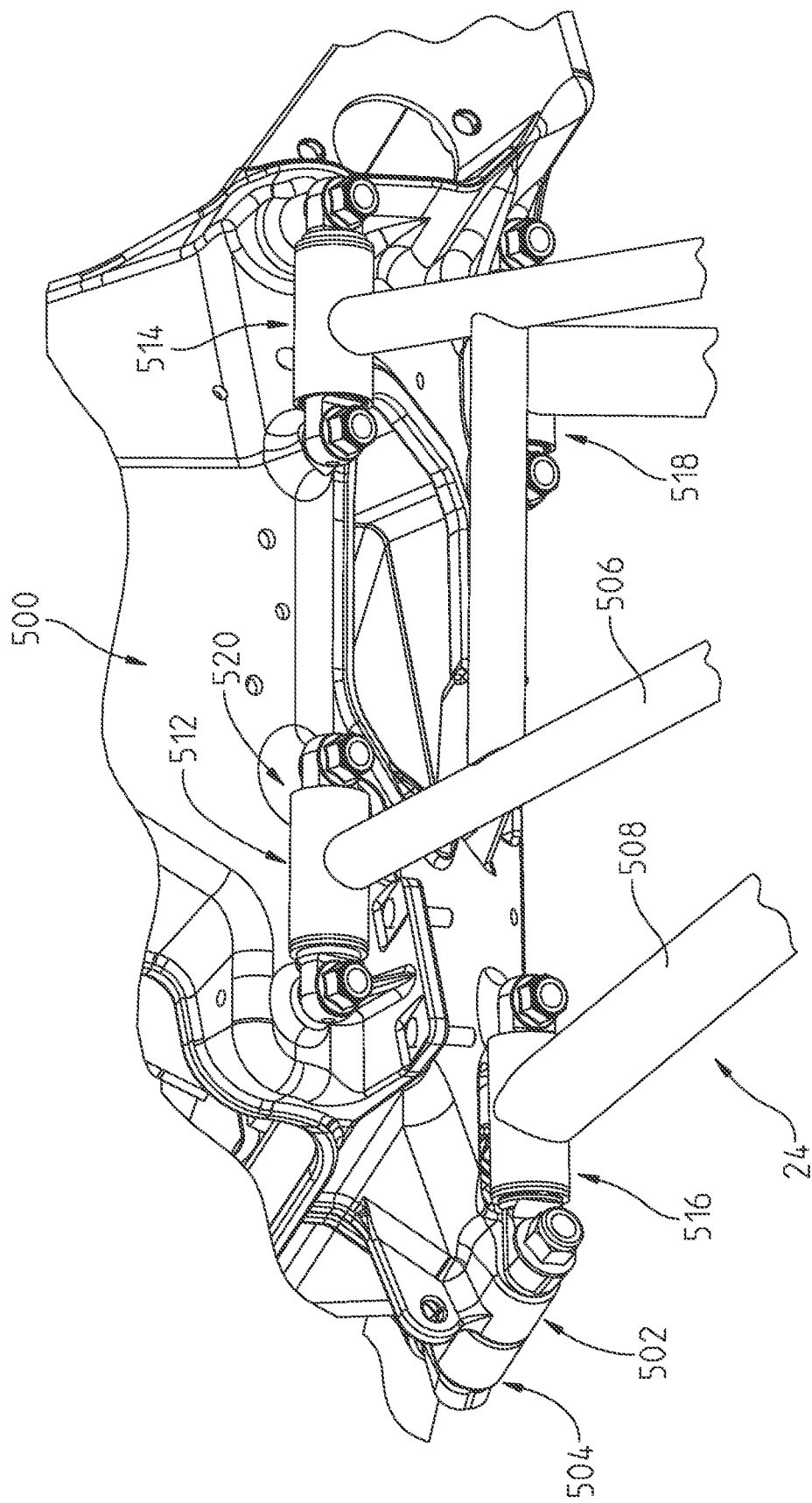
FIG. 25 shows a left side view of the front suspension.

With reference first to FIG. 25, snowmobile 2 includes a front bulkhead 500 comprised of mirror image cast members 502, 504. The front suspension 24 is coupled to bulkhead 500. For example, front suspension 24 includes an upper A-arm 506 and a lower A-arm 508 each of which is coupled to the left cast member 502. Counterpart A-arms similar to 506, 508 (shown in FIG. 2) are coupled to casting 504. Upper A-arm 506 and lower A-arm 508 are coupled by their outer ends to a spindle 510 (FIG. 1) which in turn couples to steerable ski 16. Upper A-arm 506 has inner couplings 512, 514 coupled to casting 502 and lower A-arm 508 has inner couplings at 516, 518 coupled to casting 502. Couplings 512, 514, 516 and 518 are coupled to casting 502 by way of fasteners 520 such as bolts or studs, and nuts.

Figure 26:
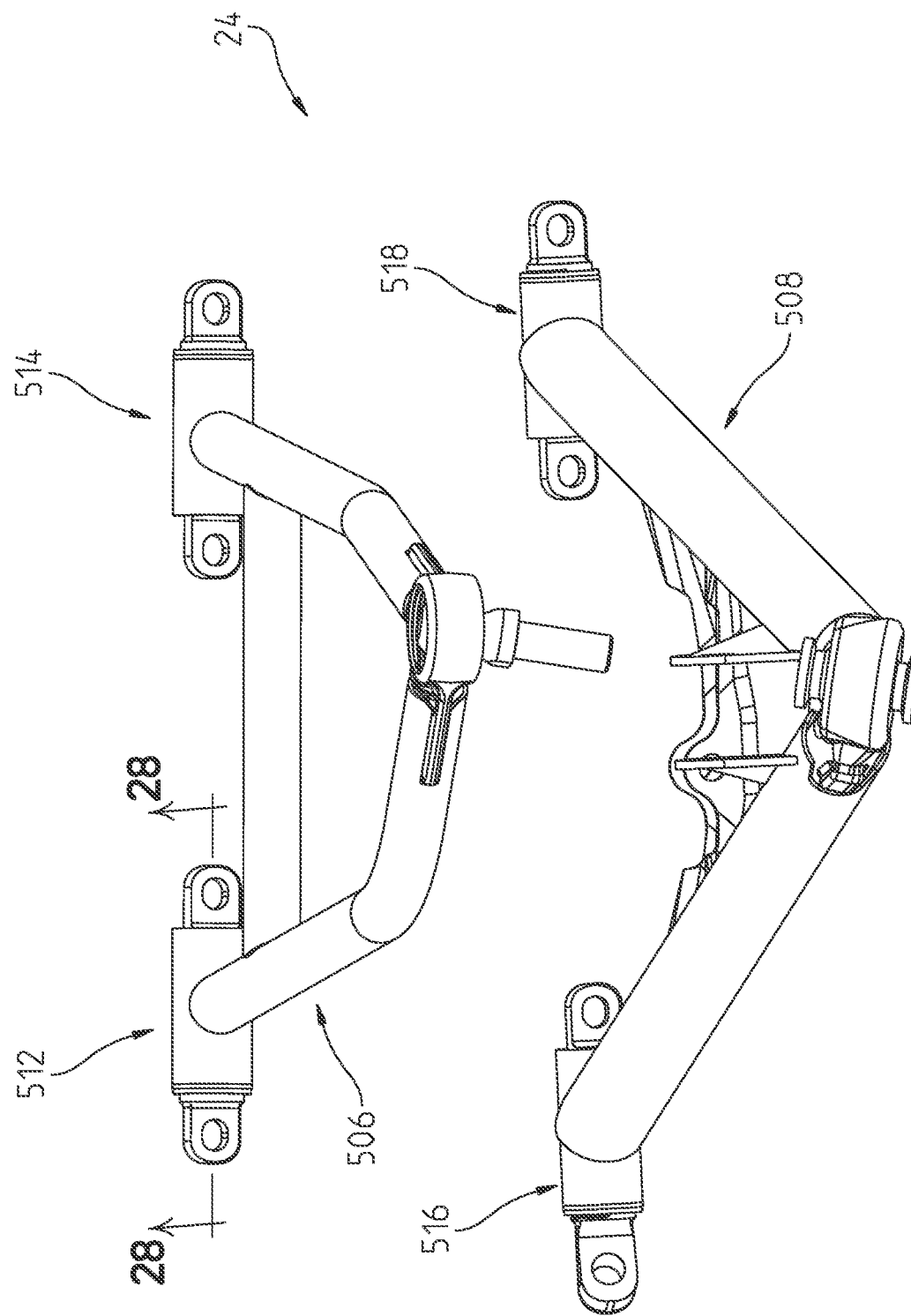
FIG. 26 shows a left side view of the upper and lower suspension arms.
Figure 27:
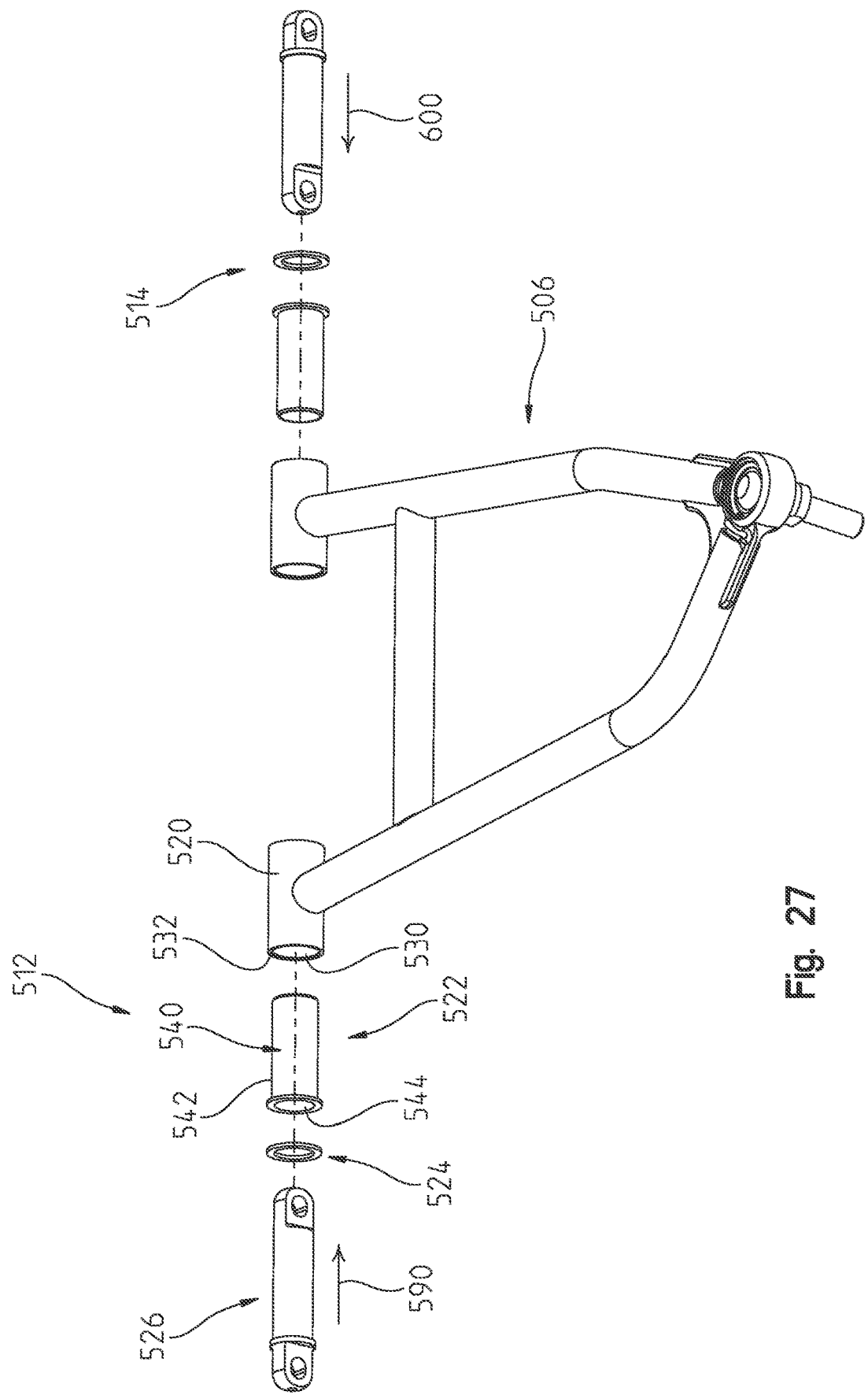
FIG. 27 shows an exploded view of the upper suspension arm in an exploded view.
Figure 27A:
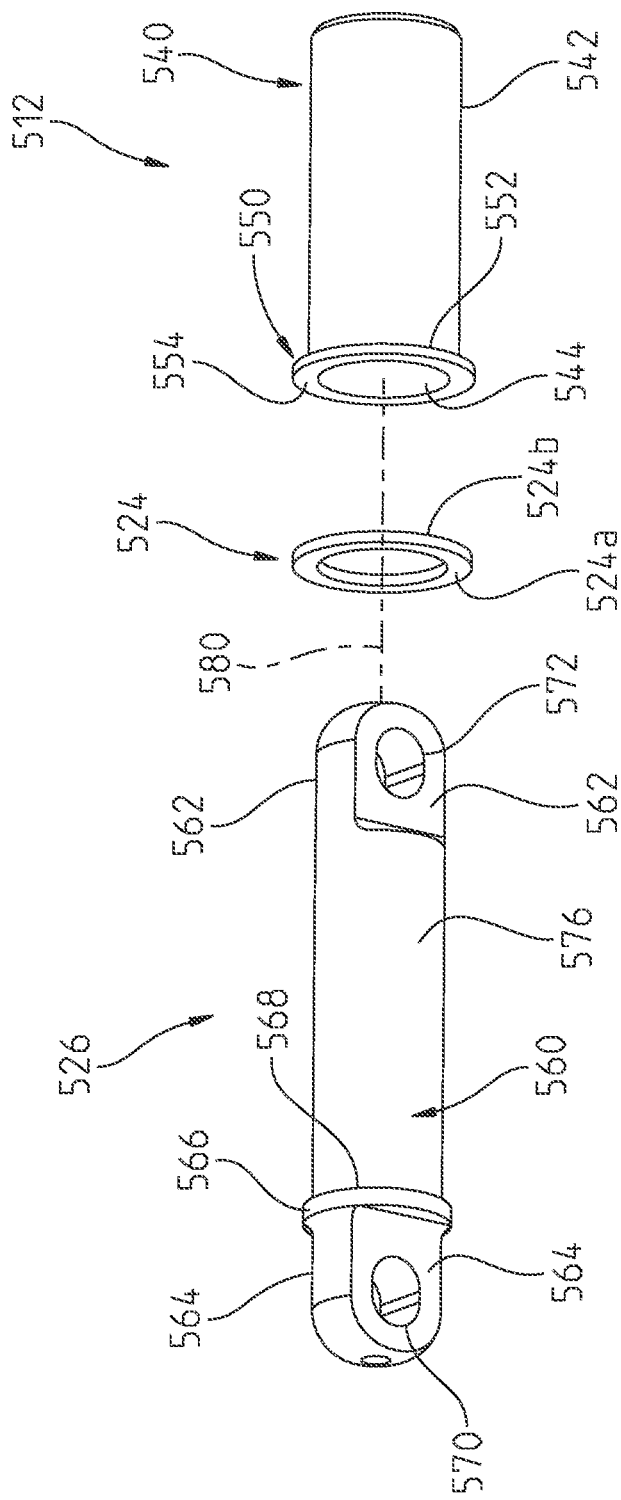
FIG. 27A is an enlarged view of a portion of the components shown in FIG. 27.

With reference now to FIGS. 26, 27, and 27A couplers 512, 514 will be described in greater detail. As shown, coupler 512 includes a coupling tube 520, sleeve 522, thrust washer 524 and coupling arm 526. As shown, coupling tube 520 includes an inner diameter 530 and an outward edge at 532. Sleeve 522 includes a cylindrical portion 540 having an outer diameter at 542 and an inner diameter at 544. Sleeve 522 includes an outer lip 550 having an inner surface 552 and an outer surface 554. Arm 526 includes a center cylindrical portion 560 having flat surfaces 562 at one end and flat surfaces 564 at the opposite end. Thrust ring or lip 566 is positioned between the flat surface of 564 and cylindrical portion 560 and includes a thrust surface 568. Arm 526 further includes slotted openings 570 at one end and slotted openings 572 at the opposite end. Cylindrical portion 560 includes outer diameter at 576. Thus openings 570 and 572 are elongated in the longitudinal direction of arm 526, or along axis 580 (FIG. 27A). It should be appreciated that coupler 514 is identical in assembly components, that is including sleeve 540, washer 524 and arm 526, the components however are simply reversed as that described above with reference to coupler 512 as will be described herein.

As shown in FIGS. 27A and 28, sleeve 540 is positioned in coupling tube 520 with outer surface 542 positioned within opening 530 of coupling tube 520. Inner surface 552 of sleeve lip 550 abuts outer surface 532 of coupling tube 520. Arm 526 is positioned within sleeve 540 with outer diameter 576 positioned against inner diameter 544 of sleeve 540 and with thrust washer 524 positioned intermediate surfaces 554 (FIG. 27A), and 568. Thus as any of the surfaces 568, 524A, 524B, 554, 552 or 532 begin to wear, fasteners 520 (FIG. 25) may be loosened and arm 526 may be moved to the right or in the direction of arrow 590 as shown in FIG. 27. The same goes for coupler 514 whereby arm 526 may be moved in the direction of arrow 600 as shown in FIG. 27. However, in the embodiment shown, the thrust washer has a lower hardness than the sleeve 540 and the arm 526, such that the wear is defined at the thrust washer. The wear could be defined at the sleeve, by having the sleeve hardness lower than the arm 26 and washer 524.

Figure 30:
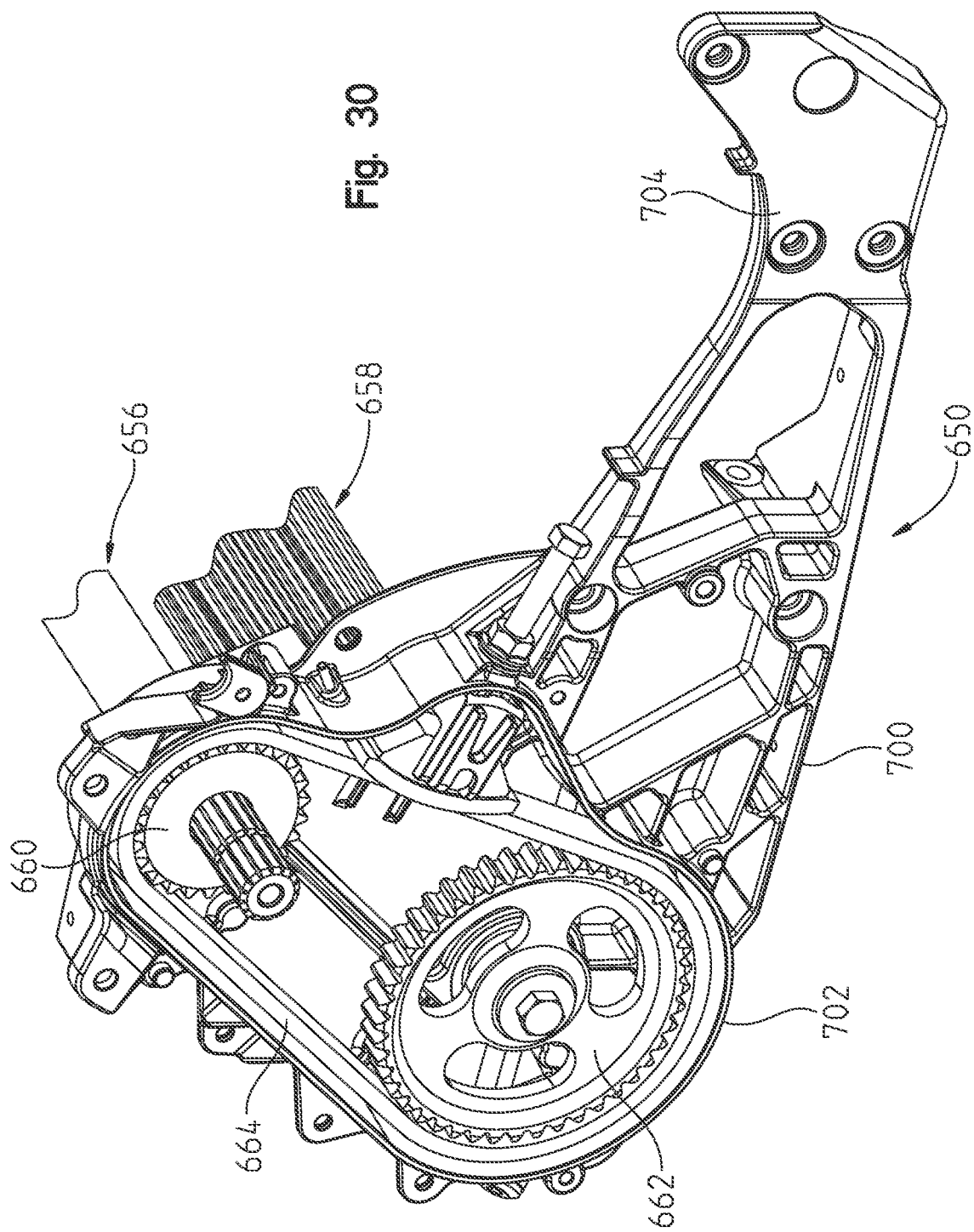
FIG. 30 shows a view similar to that of FIG. 29, with the transfer case cover removed.
Figure 31:
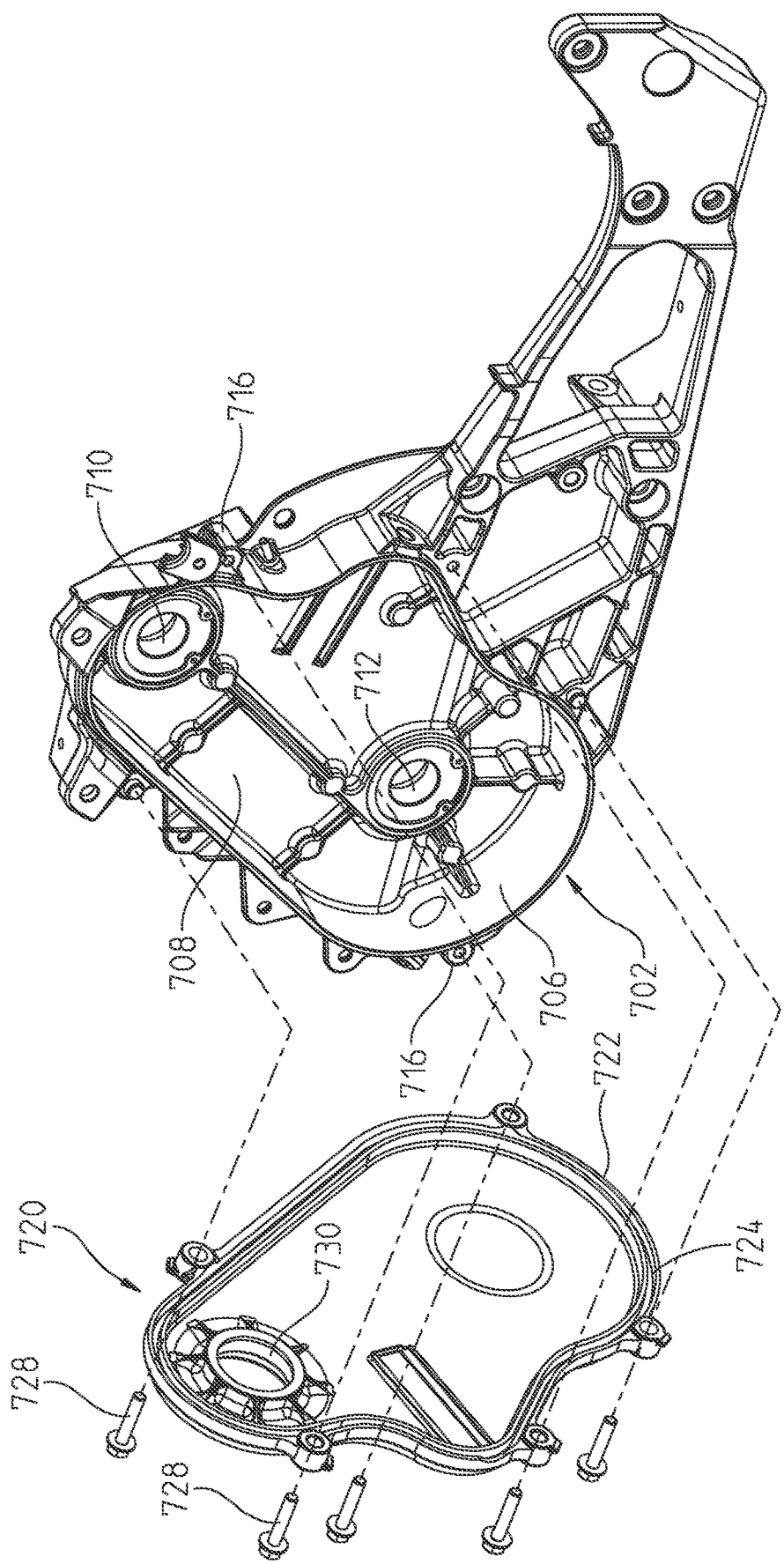
FIG. 31 shows a view similar to that of FIG. 30 with the gears removed.

With reference now to FIGS. 29-31, the snowmobile drive system 42 will be described in greater detail. It should be appreciated snowmobile drive system 42 is similar to that disclosed in US Publication 20130032419, the subject matter of which is incorporated herein in its entirety.

With reference first to FIGS. 29-30, front bulkhead 500 is shown coupled to a snowmobile front frame portion 208, also referred to as an engine cradle, which includes frame portion 650 extending forwardly from snowmobile tunnel 202. The frame portion 650 supports a first drive member 654 including pulley 655 (FIG. 29) which is coupled to driveshaft 656 (FIG. 30) which in turn drives a driveshaft 658. Driveshaft 658 is coupled to driveshaft 656 by way of sprockets 660 and 662 driven through chain 664.

As shown best in FIGS. 30 and 31, frame portion 650 includes a forwardly extending leg portion 700 having a gear casing 702 coupled to a rear end thereof, and a mounting bracket 704 at a front end thereof. Casing 702 includes a peripheral wall 706 which defines an inner volume to the casing forward of a rear wall 708. Apertures 710, 712 extend through wall 708 and form openings for jackshaft 656 and driveshaft 658. Casing 702 defines a volume for receiving gears 660, 662 as shown best in FIG. 30. Casing 702 includes a plurality of bosses 716, as described herein.

A cover 720 has a peripheral edge 722 having a geometry which coincides with wall 706. Cover 720 includes an inner groove 724 for receiving a seal to receive an edge of wall 706 therein for a sealed connection therewith. Cover 720 further provides a plurality of bosses 726 which correspond with bosses 716 for receiving fasteners 728 there through. Cover 720 further provides an opening 730 corresponding to opening 710, providing access for a brake disc 740 mounted to shaft 656.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

The invention claimed is:
1. A snowmobile, comprising:
 a chassis;
 a water cooled engine supported by the chassis; and
 a cooler, the cooler comprising:
  a top wall,
  a lower wall, internal ribs connecting the top and lower wall and defining at least one channel, an opening in the top wall, the opening providing access to the at least one channel, an insert having an inlet port, an outlet port and a separating rib, the insert to be received by the opening with the separating rib separating the at least one channel into two divided channel portions, the inlet port communicating with a first divided channel portion of the two divided channel portions and the outlet port communicating with a second divided channel portion of the two divided channel portions, and side walls positioned between the top and lower wall and enclosing the at least one channel.

2. The snowmobile of claim 1, wherein the cooler is extruded to define the top wall, lower wall and internal ribs.

3. The snowmobile of claim 1, further comprising cooling fins on one of the top or lower wall.

4. The snowmobile of claim 1, wherein portions of the internal ribs are cut away at each end defining passageways between the at least one channel.

5. The snowmobile of claim 1, further comprising a pair of apertures positioned on one of the top or lower wall.

6. The snowmobile of claim 1, wherein the insert comprises a top plate and a front plate, and the inlet port and the outlet port are positioned on the top plate.

* * * * *

UNITED STATES PATENT AND TRADEMARK OFFICE
CERTIFICATE OF CORRECTION

| | | |
|---|---|---|
| PATENT NO. | : 11,753,114 B2 | |
| APPLICATION NO. | : 17/679595 | |
| DATED | : September 12, 2023 | |
| INVENTOR(S) | : Jan R. Vistad et al. | |

It is certified that error appears in the above-identified patent and that said Letters Patent is hereby corrected as shown below:

On the Title Page

Item (72) Inventors should read:
-(72) Inventors: Jan R. Vistad, Roseau, MN (US);
Dustin A. Mertens, Roseau, MN (US);
Andrew J. Mills, Daniel, WY (US);
Michael A. Hedlund, Roseau, MN (US);
Matthew J. Prusak, Salol, MN (US);
Barry A. Johnson, Roseau, MN (US);
Jeffrey A. Eaton, Roseau, MN (US)-

Signed and Sealed this
Twenty-first Day of May, 2024

Katherine Kelly Vidal
*Director of the United States Patent and Trademark Office*